(12) United States Patent
Hyde et al.

(10) Patent No.: US 9,174,791 B2
(45) Date of Patent: Nov. 3, 2015

(54) TEMPERATURE-STABILIZED STORAGE SYSTEMS

(75) Inventors: Roderick A. Hyde, Redmond, WA (US); Edward K. Y. Jung, Bellevue, WA (US); Nathan P. Myhrvold, Medina, WA (US); Clarence T. Tegreene, Bellevue, WA (US); William H. Gates, III, Redmond, WA (US); Charles Whitmer, North Bend, WA (US); Lowell L. Wood, Jr., Bellevue, WA (US)

(73) Assignee: TOKITAE LLC, Bellevue, WA (US)

(*) Notice: Subject to any disclaimer, the term of this patent is extended or adjusted under 35 U.S.C. 154(b) by 800 days.

(21) Appl. No.: 12/006,089

(22) Filed: Dec. 27, 2007

(65) Prior Publication Data

US 2009/0145164 A1 Jun. 11, 2009

Related U.S. Application Data

(63) Continuation-in-part of application No. 12/001,757, filed on Dec. 11, 2007, and a continuation-in-part of application No. 12/006,088, filed on Dec. 27, 2007.

(51) Int. Cl.
*B65D 25/14* (2006.01)
*B65D 35/14* (2006.01)
(Continued)

(52) U.S. Cl.
CPC ........ *B65D 81/3813* (2013.01); *B65D 81/3825* (2013.01); *F25D 3/08* (2013.01)

(58) Field of Classification Search
CPC ........ B65D 49/12; B65D 17/00; B65D 17/02; B65D 17/04; B65D 17/08; B65D 2101/0015
USPC ........... 220/592.26, 459.1, 459.5, FOR. 135, 220/DIG. 9, DIG. 16, 500, 501, 503, 505, 220/506, 507, 523, 527, 528, 553, 560.1, 220/560.12, 560.13
See application file for complete search history.

(56) References Cited

U.S. PATENT DOCUMENTS

| 520,584 A | 5/1894 | Turner |
|---|---|---|
| 1,903,171 A | 3/1933 | Cordrey |

(Continued)

FOREIGN PATENT DOCUMENTS

| CN | 2414742 Y | 1/2001 |
|---|---|---|
| CN | 2460457 Y | 11/2001 |

(Continued)

OTHER PUBLICATIONS

3M Monitor Mark™; "Time Temperature Indicators—Providing a visual history of time temperature exposure"; 3M Microbiology; bearing a date of 2006; pp. 1-4; located at 3M.com/microbiology.

(Continued)

*Primary Examiner* — Fenn Mathew
*Assistant Examiner* — Andrew T Kirsch
(74) *Attorney, Agent, or Firm* — Dorsey & Whitney LLP

(57) ABSTRACT

Systems include at least one substantially thermally sealed storage container, including an outer assembly including one or more sections of ultra efficient insulation material substantially defining at least one thermally sealed storage region, and an inner assembly including one or more interlocks configured to provide controllable egress of a quantity of a material from one or more of the at least one thermally sealed storage region.

54 Claims, 7 Drawing Sheets

(51) Int. Cl.
  *B65D 90/00* (2006.01)
  *B65D 1/24* (2006.01)
  *B65D 1/36* (2006.01)
  *B65D 25/04* (2006.01)
  *B65D 57/00* (2006.01)
  *B65D 85/00* (2006.01)
  *F17C 1/00* (2006.01)
  *F17C 3/00* (2006.01)
  *F17C 13/00* (2006.01)
  *A47J 39/00* (2006.01)
  *B65D 81/38* (2006.01)
  *F25D 3/08* (2006.01)

(56) References Cited

U.S. PATENT DOCUMENTS

| | | | |
|---|---|---|---|
| 2,161,295 | A | 6/1939 | Hirschberg |
| 2,496,296 | A | 2/1950 | Lobl |
| 2,717,937 | A | 9/1955 | Lehr et al. |
| 2,967,152 | A | 1/1961 | Matsch et al. |
| 3,029,967 | A | 4/1962 | Morrison |
| 3,034,845 | A | 5/1962 | Haumann |
| 3,069,045 | A | 12/1962 | Haumann et al. |
| 3,108,840 | A | 10/1963 | Conrad et al. |
| 3,238,002 | A | 3/1966 | O'Connell, et al. |
| 3,921,844 | A | 11/1975 | Walles |
| 3,948,411 | A | 4/1976 | Conte |
| 4,003,426 | A | 1/1977 | Best et al. |
| 4,034,129 | A | 7/1977 | Kittle |
| 4,057,029 | A | 11/1977 | Seiter |
| 4,057,101 | A | 11/1977 | Ruka et al. |
| 4,094,127 | A | 6/1978 | Romagnoli |
| 4,154,363 | A | 5/1979 | Barthel |
| 4,184,601 | A | 1/1980 | Stewart et al. |
| 4,312,669 | A | 1/1982 | Boffito et al. |
| 4,318,058 | A | 3/1982 | Mito et al. |
| 4,358,490 | A | 11/1982 | Nagai |
| 4,388,051 | A * | 6/1983 | Dresler et al. ............ 417/505 |
| 4,402,927 | A | 9/1983 | Von Dardel et al. |
| 4,428,854 | A | 1/1984 | Enjo et al. |
| 4,481,779 | A | 11/1984 | Barthel |
| 4,481,792 | A | 11/1984 | Groeger et al. |
| 4,482,465 | A | 11/1984 | Gray |
| 4,521,800 | A | 6/1985 | Howe |
| 4,526,015 | A | 7/1985 | Laskaris |
| 4,640,574 | A | 2/1987 | Unger |
| 4,726,974 | A | 2/1988 | Nowobilski et al. |
| 4,766,471 | A | 8/1988 | Ovshinsky et al. |
| 4,796,432 | A | 1/1989 | Fixsen et al. |
| 4,810,403 | A | 3/1989 | Bivens et al. |
| 4,855,950 | A | 8/1989 | Takada |
| 4,862,674 | A | 9/1989 | Lejondahl et al. |
| 4,920,387 | A | 4/1990 | Takasu et al. |
| 4,951,014 | A | 8/1990 | Wohlert et al. |
| 4,955,204 | A | 9/1990 | Pehl et al. |
| 4,956,976 | A * | 9/1990 | Kral et al. .............. 62/610 |
| 4,969,336 | A | 11/1990 | Knippscheer et al. |
| 4,974,423 | A | 12/1990 | Pring |
| 4,976,308 | A | 12/1990 | Faghri |
| 5,012,102 | A | 4/1991 | Gowlett |
| 5,103,337 | A | 4/1992 | Schrenk et al. |
| 5,116,105 | A | 5/1992 | Hong |
| 5,138,559 | A | 8/1992 | Kuehl et al. |
| 5,187,116 | A | 2/1993 | Kitagawa et al. |
| 5,215,214 | A | 6/1993 | Lev et al. |
| 5,245,869 | A | 9/1993 | Clarke et al. |
| 5,261,241 | A | 11/1993 | Kitahara et al. |
| 5,277,031 | A | 1/1994 | Miller et al. |
| 5,277,959 | A | 1/1994 | Kourtides et al. |
| 5,302,840 | A | 4/1994 | Takikawa |
| 5,330,816 | A | 7/1994 | Rusek, Jr. |
| 5,355,684 | A * | 10/1994 | Guice ................. 62/54.2 |
| 5,359,890 | A | 11/1994 | Fulton et al. |
| 5,376,184 | A | 12/1994 | Aspden |
| 5,390,734 | A | 2/1995 | Voorhes et al. |
| 5,390,791 | A | 2/1995 | Yeager |
| 5,444,223 | A | 8/1995 | Blama |
| 5,452,565 | A | 9/1995 | Blom et al. |
| 5,505,046 | A | 4/1996 | Nelson et al. |
| 5,548,116 | A | 8/1996 | Pandelisev |
| 5,563,182 | A | 10/1996 | Epstein et al. |
| 5,573,133 | A | 11/1996 | Park |
| 5,580,522 | A | 12/1996 | Leonard et al. |
| 5,590,054 | A | 12/1996 | McIntosh |
| 5,600,071 | A | 2/1997 | Sooriakumar et al. |
| 5,607,076 | A * | 3/1997 | Anthony ................ 220/501 |
| 5,633,077 | A | 5/1997 | Olinger |
| 5,671,856 | A | 9/1997 | Lisch |
| 5,679,412 | A | 10/1997 | Kuehnle et al. |
| 5,709,472 | A | 1/1998 | Prusik et al. |
| 5,782,344 | A | 7/1998 | Edwards et al. |
| 5,800,905 | A | 9/1998 | Sheridan et al. |
| 5,821,762 | A | 10/1998 | Hamaguchi et al. |
| 5,829,594 | A | 11/1998 | Warder |
| 5,831,489 | A | 11/1998 | Wire |
| 5,846,224 | A | 12/1998 | Sword et al. |
| 5,846,883 | A | 12/1998 | Moslehi |
| 5,857,778 | A | 1/1999 | Ells |
| 5,900,554 | A | 5/1999 | Baba et al. |
| 5,915,283 | A | 6/1999 | Reed et al. |
| 6,030,580 | A | 2/2000 | Raasch et al. |
| 6,042,264 | A | 3/2000 | Prusik et al. |
| 6,050,598 | A | 4/2000 | Upton |
| 6,209,343 | B1 | 4/2001 | Owen |
| 6,212,904 | B1 | 4/2001 | Arkharov et al. |
| 6,213,339 | B1 | 4/2001 | Lee |
| 6,234,341 | B1 | 5/2001 | Tattam |
| 6,272,679 | B1 | 8/2001 | Norin |
| 6,287,652 | B2 | 9/2001 | Speckhals et al. |
| 6,321,977 | B1 | 11/2001 | Lee |
| 6,337,052 | B1 | 1/2002 | Rosenwasser |
| 6,438,992 | B1 | 8/2002 | Smith et al. |
| 6,439,406 | B1 | 8/2002 | Duhon |
| 6,453,749 | B1 | 9/2002 | Petrovic et al. |
| 6,465,366 | B1 | 10/2002 | Nemani et al. |
| 6,467,642 | B2 | 10/2002 | Mullens et al. |
| 6,485,805 | B1 | 11/2002 | Smith et al. |
| 6,521,077 | B1 | 2/2003 | McGivern et al. |
| 6,571,971 | B1 | 6/2003 | Weiler |
| 6,584,797 | B1 | 7/2003 | Smith et al. |
| 6,624,349 | B1 | 9/2003 | Bass |
| 6,673,594 | B1 | 1/2004 | Owen et al. |
| 6,688,132 | B2 | 2/2004 | Smith et al. |
| 6,692,695 | B1 | 2/2004 | Bronshtein et al. |
| 6,701,724 | B2 | 3/2004 | Smith et al. |
| 6,742,650 | B2 | 6/2004 | Yang et al. |
| 6,742,673 | B2 | 6/2004 | Credle, Jr. et al. |
| 6,751,963 | B2 | 6/2004 | Navedo et al. |
| 6,771,183 | B2 | 8/2004 | Hunter |
| 6,806,808 | B1 | 10/2004 | Watters et al. |
| 6,813,330 | B1 | 11/2004 | Barker et al. |
| 6,841,917 | B2 | 1/2005 | Potter |
| 6,877,504 | B2 | 4/2005 | Schreff et al. |
| 6,967,051 | B1 | 11/2005 | Augustynowicz et al. |
| 6,997,241 | B2 | 2/2006 | Chou et al. |
| 7,001,656 | B2 | 2/2006 | Maignan et al. |
| 7,038,585 | B2 | 5/2006 | Hall et al. |
| 7,128,807 | B2 | 10/2006 | Mörschner et al. |
| 7,240,513 | B1 | 7/2007 | Conforti |
| 7,253,788 | B2 | 8/2007 | Choi et al. |
| 7,258,247 | B2 | 8/2007 | Marquez |
| 7,267,795 | B2 | 9/2007 | Ammann et al. |
| 7,278,278 | B2 | 10/2007 | Wowk et al. |
| 7,596,957 | B2 | 10/2009 | Fuhr et al. |
| 7,789,258 | B1 | 9/2010 | Anderson |
| 7,807,242 | B2 | 10/2010 | Soerensen et al. |
| 7,982,673 | B2 | 7/2011 | Orton et al. |
| 8,074,271 | B2 | 12/2011 | Davis et al. |
| 8,138,913 | B2 | 3/2012 | Nagel et al. |
| 8,174,369 | B2 | 5/2012 | Jones et al. |
| 8,211,516 | B2 | 7/2012 | Bowers et al. |
| 2002/0050514 | A1 | 5/2002 | Schein |
| 2002/0083717 | A1 | 7/2002 | Mullens et al. |

(56) References Cited

U.S. PATENT DOCUMENTS

| | | |
|---|---|---|
| 2002/0084235 A1 | 7/2002 | Lake |
| 2002/0130131 A1 | 9/2002 | Zucker et al. |
| 2002/0155699 A1 | 10/2002 | Ueda |
| 2002/0187618 A1 | 12/2002 | Potter |
| 2003/0039446 A1 | 2/2003 | Hutchinson et al. |
| 2003/0072687 A1 | 4/2003 | Nehring et al. |
| 2003/0148773 A1 | 8/2003 | Spriestersbach et al. |
| 2003/0160059 A1 | 8/2003 | Credle, Jr. et al. |
| 2004/0035120 A1 | 2/2004 | Brunnhofer |
| 2004/0055313 A1 | 3/2004 | Navedo et al. |
| 2004/0055600 A1 | 3/2004 | Izuchukwu |
| 2004/0103302 A1 | 5/2004 | Yoshimura et al. |
| 2004/0113790 A1 | 6/2004 | Hamel et al. |
| 2004/0145533 A1 | 7/2004 | Taubman |
| 2005/0009192 A1* | 1/2005 | Page ................. 436/55 |
| 2005/0029149 A1 | 2/2005 | Leung et al. |
| 2005/0053345 A1 | 3/2005 | Bayindir et al. |
| 2005/0067441 A1 | 3/2005 | Alley |
| 2005/0143787 A1 | 6/2005 | Boveja et al. |
| 2005/0188715 A1 | 9/2005 | Aragon |
| 2005/0247312 A1 | 11/2005 | Davies |
| 2005/0255261 A1 | 11/2005 | Nomula |
| 2005/0274378 A1 | 12/2005 | Bonney et al. |
| 2006/0021355 A1 | 2/2006 | Boesel et al. |
| 2006/0027467 A1 | 2/2006 | Ferguson |
| 2006/0054305 A1 | 3/2006 | Ye |
| 2006/0071585 A1 | 4/2006 | Wang |
| 2006/0086808 A1 | 4/2006 | Appalucci et al. |
| 2006/0150662 A1 | 7/2006 | Lee et al. |
| 2006/0187026 A1 | 8/2006 | Kochis |
| 2006/0191282 A1 | 8/2006 | Sekiya et al. |
| 2006/0196876 A1 | 9/2006 | Rohwer |
| 2006/0196878 A1 | 9/2006 | Cook |
| 2006/0220978 A1 | 10/2006 | Atchiriki |
| 2006/0259188 A1 | 11/2006 | Berg |
| 2006/0280007 A1 | 12/2006 | Ito et al. |
| 2007/0041814 A1 | 2/2007 | Lowe |
| 2007/0046559 A1 | 3/2007 | Youn |
| 2007/0210090 A1 | 9/2007 | Sixt et al. |
| 2008/0012577 A1 | 1/2008 | Potyrailo et al. |
| 2008/0022698 A1 | 1/2008 | Hobbs et al. |
| 2008/0060215 A1 | 3/2008 | Reilly et al. |
| 2008/0129511 A1 | 6/2008 | Yuen et al. |
| 2008/0164265 A1 | 7/2008 | Conforti |
| 2008/0184719 A1 | 8/2008 | Lowenstein |
| 2008/0186139 A1 | 8/2008 | Butler et al. |
| 2008/0231453 A1 | 9/2008 | Corder |
| 2008/0233391 A1 | 9/2008 | Sterzel et al. |
| 2008/0269676 A1 | 10/2008 | Bieberich et al. |
| 2008/0272131 A1 | 11/2008 | Roberts et al. |
| 2008/0297346 A1 | 12/2008 | Brackmann et al. |
| 2009/0049845 A1 | 2/2009 | McStravick et al. |
| 2009/0275478 A1 | 11/2009 | Atkins et al. |
| 2009/0301125 A1 | 12/2009 | Myles et al. |
| 2009/0309733 A1 | 12/2009 | Moran et al. |
| 2010/0016168 A1 | 1/2010 | Atkins et al. |
| 2010/0028214 A1 | 2/2010 | Howard et al. |
| 2010/0265068 A1 | 10/2010 | Brackmann et al. |
| 2010/0287963 A1 | 11/2010 | Billen et al. |
| 2011/0100605 A1 | 5/2011 | Zheng et al. |
| 2011/0117538 A1 | 5/2011 | Niazi |
| 2011/0248825 A1 | 10/2011 | Hamel et al. |
| 2011/0297306 A1 | 12/2011 | Yang |
| 2012/0168645 A1 | 7/2012 | Atzmony et al. |
| 2013/0306656 A1 | 11/2013 | Eckhoff et al. |

FOREIGN PATENT DOCUMENTS

| | | |
|---|---|---|
| CN | 1496537 A | 5/2004 |
| CN | 1756912 A | 4/2006 |
| CN | 1827486 A | 9/2006 |
| CN | 101073524 A | 11/2007 |
| FR | 2 621 685 | 10/1987 |
| GB | 2 441 636 A | 3/2008 |
| WO | WO 94/15034 | 7/1994 |
| WO | WO 99/36725 A1 | 7/1999 |
| WO | WO 2005/084353 A2 | 9/2005 |
| WO | WO 2007/039553 A2 | 4/2007 |

OTHER PUBLICATIONS

Arora, Anubhav; Hakim, Itzhak; Baxter, Joy; Rathnasingham, Ruben; Srinivasan, Ravi; Fletcher, Daniel A.; "Needle-Free Delivery of Macromolecules Across the Skin by Nanoliter-Volume Pulsed Microjets"; PNAS Applied Biological Sciences; Mar. 13, 2007; pp. 4255-4260; vol. 104; No. 11; The National Academy of Sciences USA.

Bang, Abhay T.; Bang, Rani A.; Baitule, Sanjay B.; Reddy, M. Hanimi; Deshmukh, Mahesh D.; "Effect of Home-Based Neonatal Care and Management of Sepsis on Neonatal Mortality: Field Trial in Rural India"; The Lancet; Dec. 4, 1999; pp. 1955-1961; vol. 354; SEARCH (Society for Education, Action, and Research in Community Health).

Brenzel, Logan; Wolfson, Lara J.; Fox-Rushby, Julia; Miller, Mark; Halsey, Neal A.; "Vaccine-Preventable Diseases—Chapter 20"; Disease Control Priorities in Developing Countries; printed on Oct. 15, 2007; pp. 389-411.

CDC; "Vaccine Management: Recommendations for Storage and Handling of Selected Biologicals"; Jan. 2007; 16 pages total; Department of Health & Human Services U.S.A.

Chiritescu, Catalin; Cahill, David G.; Nguyen, Ngoc; Johnson, David; Bodapati, Arun; Keblinski, Pawel; Zschack, Paul; "Ultralow Thermal Conductivity in Disordered, Layered $WSe_2$ Crystals; Science"; Jan. 19, 2007; pp. 351-353; vol. 315; The American Association for the Advancement of Science.

Cohen, Sharon; Hayes, Janice S. Tordella, Tracey; Puente, Ivan; "Thermal Efficiency of Prewarmed Cotton, Reflective, and Forced—Warm-Air Inflatable Blankets in Trauma Patients"; International Journal of Trauma Nursing; Jan.-Mar. 2002; pp. 4-8; vol. 8; No. 1; The Emergency Nurses Association.

Cole-Parmer; "Temperature Labels and Crayons"; www.coleparmer.com; bearing a date of 1971 and printed on Sep. 27, 2007; p. 1.

Cornell University Coop; "The Food Keeper"; printed on Oct. 15, 2007; 7 pages total (un-numbered).

Daryabeigi, Kamran; "Thermal Analysis and Design Optimization of Multilayer Insulation for Reentry Aerodynamic Heating"; Journal of Spacecraft and Rockets; Jul.-Aug. 2002; pp. 509-514; vol. 39; No. 4; American Institute of Aeronautics and Astronautics Inc.

Department of Health and Social Services, Division of Public Health, Section of Community Health and EMS, State of Alaska; Cold Injuries Guidelines—Alaska Multi-Level 2003 Version; bearing dates of 2003 and Jan. 2005; pp. 1-60; located at http://www.chems.alaska.gov.

Ette, Ene I.; "Conscience, the Law, and Donation of Expired Drugs"; The Annals of Pharmacotherapy; Jul./Aug. 2004; pp. 1310-1313; vol. 38.

Fricke, Jochen; Emmerling, Andreas; "Aerogels—Preparation, Properties, Applications"; Structure and Bonding; 1992; pp. 37-87; vol. 77; Springer-Verlag Berlin Heidelberg.

JAMC; "Preventing Cold Chain Failure: Vaccine Storage and Handling"; JAMC; Oct. 26, 2004; p. 1050; vol. 171; No. 9; Canadian Medical Association.

Jorgensen, Pernille; Chanthap, Lon; Rebueno, Antero; Tsuyuoka, Reiko; Bell, David; "Malaria Rapid Diagnostic Tests in Tropical Climates: The Need for a Cool Chain"; American Journal of Tropical Medicine and Hygiene; 2006; pp. 750-754; vol. 74; No. 5; The American Society of Tropical Medicine and Hygiene.

Levin, Carol E.; Nelson, Carib M.; Widjaya, Anton; Moniaga, Vanda; Anwar, Chairiyah; "The Costs of Home Delivery of a Birth Dose of Hepatitis B Vaccine in a Prefilled Syringe in Indonesia"; Bulletin of the World Health Organization; Jun. 2005; pp. 456-461 + 1 pg. Addenda; vol. 83; No. 6.

(56) References Cited

OTHER PUBLICATIONS

Llanos-Cuentas, A.; Campos, P.; Clendenes, M.; Canfield. C.J.; Hutchinson, D.B.A.; "Atovaquone and Proguanil Hydrochloride Compared with Chloroquine or Pyrimethamine/Sulfadoxine for Treatment of Acute Plasmodium Falciparum Malaria in Peru"; The Brazilian Journal of Infectious Diseases; 2001; pp. 67-72; vol. 5; No. 2; The Brazilian Journal of Infectious Diseases and Contexto Publishing.
Lockman, Shahin; Ndase, P.; Holland, D.; Shapiro, R.; Connor, J.; Capparelli, E.; "Stability of Didanosine and Stavudine Pediatric Oral Solutions and Kaletra Capsules at Temperatures from 4° C. to 55° C."; 12th Conference on Retroviruses and Opportunistic Infections, Boston, Massachusetts; Feb. 22-25, 2005; p. 1; Foundation for Retrovirology and Human Health.
Moonasar, Devanand; Goga, Ameena Ebrahim; Frean, John; Kruger, Philip; Chandramohan; Daniel; "An Exploratory Study of Factors that Affect the Performance and Usage of Rapid Diagnostic Tests for Malaria in the Limpopo Province, South Africa"; Malaria Journal; Jun. 2007; pp. 1-5; vol. 6; No. 74; Moonasar et al.; licensee BioMed Central Ltd.
Moshfegh, B.; "A New Thermal Insulation System for Vaccine Distribution; Journal of Thermal Insulation"; Jan. 1992; pp. 226-247; vol. 15; Technomic Publishing Co., Inc.
Nolan, Timothy D. C.; Hattler, Brack G.; Federspiel, William J.; "Development of a Balloon Volume Sensor for Pulsating Balloon Catheters"; ASAIO Journal; 2004; pp. 225-233; vol. 50; No. 3; American Society of Artificial Internal Organs.
PATH—A Catalyst for Global Health; "Uniject™Device — The Radically Simple Uniject™ Device—Rethinking the Needle to Improve Immunization"; bearing dates of 1995-2006; printed on Oct. 11, 2007; pp. 1-2; located at http://www.path.org/projects/uniject.php; PATH Organization.
Pekala, R. W.; "Organic Aerogels From the Polycondensation of Resorcinol With Formaldehyde"; Journal of Materials Science; Sep. 1989; pp. 3221-3227; vol. 24; No. 9; Springer Netherlands.
Pickering, Larry K.; Wallace, Gregory; Rodewald, Lance; "Too Hot, Too Cold: Issues with Vaccine Storage"; Pediatrics®—Official Journal of the American Academy of Pediatrics; 2006; pp. 1738-1739 (4 pages total, incl. cover sheet and end page); vol. 118; American Academy of Pediatrics.
Post, Richard F.; "Maglev: A New Approach"; Scientific American; Jan. 2000; pp. 82-87; Scientific American, Inc.
Program for Appropriate Technology in Health (PATH); "The Radically Simple Uniject Device"; PATH—Reflections on Innovations in Global Health; printed on Jan. 26, 2007; pp. 1-4; located at www.path.org.
Reeler, Anne V.; Simonsen, Lone; Health Access International; "Unsafe Injections, Fatal Infections"; Bill and Melinda Gates Children's Vaccine Program Occasional Paper #2; May 2000; pp. 1-8; located at www.ChildrensVaccine.org/html/safe_injection.htm.
Risha, Peter G.; Shewiyo, Danstan; Msami, Amani; Masuki, Gerald; Vergote, Geert; Vervaet, Chris; Remon, Jean Paul; "In vitro Evaluation of the Quality of Essential Drugs on the Tanzanian Market"; Tropical Medicine and International Health; Aug. 2002; pp. 701-707; vol. 7; No. 8; Blackwell Science Ltd.
Seto, Joyce; Marra, Fawziah; "Cold Chain Management of Vaccines"; Continuing Pharmacy Professional Development Home Study Program; Feb. 2005; pp. 1-19; University of British Columbia.
Shockwatch; "Environmental Indicators"; printed on Sep. 27, 2007; pp. 1-2; located at www.shockwatch.com.
Suttmeier, Chris; "Warm Mix Asphalt: A Cooler Alternative"; Material Matters—Around the Hot Mix Industry; Spring 2006; pp. 21-22; Peckham Materials Corporation.
Thompson, Marc T.; "Eddy current magnetic levitation—Models and experiments"; IEEE Potentials; Feb./Mar. 2000; pp. 40-46; IEEE.
"Two Wire Gage / Absolute Pressure Transmitters—Model 415 and 440"; Honeywell Sensotec; pp. 1-2; Located at www.sensotec.com and www.honeywell.com/sensing.
UNICEF Regional Office for Latin America & the Carribean (UNICEF-TACRO); Program for Appropriate Technology in Health (PATH); "Final Report Cold Chain Workshop," Panama City, May 31-Jun. 2, 2006; pp. 1-4 plus cover sheet, table of contents, and annexes A, B and C (22 pages total).
Valmary, Severine; Richard, Pomone; Brousset, Pierre; "Frequent Detection of Kaposi's Sarcoma Herpesvirus in Germinal Centre Macrophages from AIDS-related multicentric Castleman's Disease"; AIDS—Research Letters; 2005; pp. 1229-1236; vol. 19; Lippincott Williams & Wilkins.
World Health Organization; "Getting started with vaccine vial monitors; Vaccines and Biologicals"; World Health Organization; Dec. 2002; pp. 1-20 plus cover sheets, end sheet, contents pages, abbreviations page; revision history page and acknowledgments page (29 pages total); World Health Organization; located at www.who.int/vaccines-documents.
World Health Organization; "Getting started with vaccine vial monitors—Questions and answers on field operations"; Technical Session on Vaccine Vial Monitors, Mar. 27, 2002, Geneva; pp. 1-17 (p. 2 left intentionally blank); World Health Organization.
Yamakage, Michiaki; Sasaki, Hideaki; Jeong, Seong-Wook; Iwasaki, Sohshi; Namiki, Akiyoshi; "Safety and Beneficial Effect on Body Core Temperature of Prewarmed Plasma Substitute Hydroxyethyl Starch During Anesthesia" [Abstract]; Anesthesiology; 2004; p. A-1285; vol. 101; ASA.
Zhu, Z. Q.; Howe, D.; "Halbach Permanent Magnet Machines and Applications: A Review"; IEE Proceedings—Electric Power Applications; Jul. 2001; pp. 299-308; vol. 148; No. 4; University of Sheffield, Department of Electronic & Electrical Engineering, Sheffield, United Kingdom.
Pau, Alice K.; Moodley, Neelambal K.; Holland, Diane T.; Fomundam, Henry; Matchaba, Gugu U.; and Capparelli, Edmund V.; "Instability of lopinavir/ritonavir capsules at ambient temperatures in sub-Saharan Africa: relevance to WHO antiretroviral guidelines"; AIDS; Bearing dates of 2005, Mar. 29, 2005, and Apr. 20, 2005; pp. 1229-1236; vol. 19, No. 11; Lippincott Williams & Wilkins.
U.S. Appl. No. 12/008,695, Hyde et al.
U.S. Appl. No. 12/006,088, Hyde et al.
U.S. Appl. No. 12/001,757, Hyde et al.
Ferrotec; "Ferrofluid: Magnetic Liquid Technology"; bearing dates of 2001-2008; printed on Mar. 10, 2008; found at http://www.ferrotec.com/technology/ferrofluid.php.
Ma, Kun-Quan; and Liu, Ding; "Nano liquid-metal fluid as ultimate coolant"; Physics Letters A; bearing dates of Jul. 10, 2006, Sep. 9, 2006, Sep. 18, 2006, Sep. 26, 2006, and Jan. 29, 2007; pp. 252-256; vol. 361, Issue 3; Elsevier B.V.
U.S. Appl. No. 12/077,355, Hyde et al.
U.S. Appl. No. 12/012,490, Hyde et al.
U.S. Appl. No. 12/220,439, Hyde et al.
U.S. Appl. No. 12/152,467, Bowers et al.
U.S. Appl. No. 12/152,465, Bowers et al.
PCT International Search Report; International App. No. PCT/US08/13646; Apr. 9, 2009; pp. 1-2.
PCT International Search Report; International App. No. PCT/US08/13648; Mar. 13, 2009; pp. 1-2.
PCT International Search Report; International App. No. PCT/US08/13642; Feb. 26, 2009; pp. 1-2.
PCT International Search Report; International App. No. PCT/US08/13643; Feb. 20, 2009; pp. 1-2.
Adams, R. O.; "A review of the stainless steel surface"; The Journal of Vacuum Science and Technology A; Bearing a date of Jan.-Mar. 1983; pp. 12-18; vol. 1, No. 1; American Vacuum Society.
Bartl, J., et al.; "Emissivity of aluminium and its importance for radiometric measurement"; Measurement Science Review; Bearing a date of 2004; pp. 31-36; vol. 4, Section 3.
Beavis, L. C.; "Interaction of Hydrogen with the Surface of Type 304 Stainless Steel"; The Journal of Vacuum Science and Technology; Bearing a date of Mar.-Apr. 1973; pp. 386-390; vol. 10, No. 2; American Vacuum Society.
U.S. Appl. No. 12/658,579, Deane et al.

(56) References Cited

OTHER PUBLICATIONS

Benvenuti, C., et al.; "Pumping characteristics of the St707 nonevaporable getter (Zr 70 V 24.6-Fe 5.4 wt %)"; The Journal of Vacuum Science and Technology A; Bearing a date of Nov.-Dec. 1996; pp. 3278-3282; vol. 14, No. 6; American Vacuum Society.

Demko, J. A., et al.; "Design Tool for Cryogenic Thermal Insulation Systems"; Advances in Cryogenic Engineering: Transactions of the Cryogenic Engineering Conference—CEC; Bearing a date of 2008; pp. 145-151; vol. 53; American Institute of Physics.

Hedayat, A., et al.; "Variable Density Multilayer Insulation for Cryogenic Storage"; Contract NAS8-40836; 36$^{th}$ Joint Propulsion Conference; Bearing a date of Jul. 17-19, 2000; pp. 1-10.

Horgan, A. M., et al.; "Hydrogen and Nitrogen Desorption Phenomena Associated with a Stainless Steel 304 Low Energy Electron Diffraction (LEED) and Molecular Beam Assembly"; The Journal of Vacuum Science and Technology; Bearing a date of Jul.-Aug. 1972; pp. 1218-1226; vol. 9, No. 4.

Keller, C. W., et al.; "Thermal Performance of Multilayer Insulations, Final Report, Contract NAS 3-14377"; Bearing a date of Apr. 5, 1974; pp. 1-446.

Kishiyama, K., et al.; "Measurement of Ultra Low Outgassing Rates for NLC UHV Vacuum Chambers"; Proceedings of the 2001 Particle Accelerator Conference, Chicago; Bearing a date of 2001; pp. 2195-2197; IEEE.

Little, Arthur D.; "Liquid Propellant Losses During Space Flight, Final Report on Contract No. NASw-615"; Bearing a date of Oct. 1964; pp. 1-315.

Lockheed Missiles & Space Company; "High-Performance Thermal Protection Systems, Contract NAS 8-20758, vol. II"; Bearing a date of Dec. 31, 1969; pp. 1-117.

Nemanič, Vincenc, et al.; "Experiments with a thin-walled stainless-steel vacuum chamber"; The Journal of Vacuum Science and Technology A; Bearing a date of Jul.-Aug. 2000; pp. 1789-1793; vol. 18, No. 4; American Vacuum Society.

Nemanič, Vincenc, et al.; "Outgassing of a thin wall vacuum insulating panel"; Vacuum; Bearing a date of 1998; pp. 233-237; vol. 49, No. 3; Elsevier Science Ltd.

Nemanič, Vincenc, et al.; "A study of thermal treatment procedures to reduce hydrogen outgassing rate in thin wall stainless steel cells"; Vacuum; Bearing a date of 1999; pp. 277-280; vol. 53; Elsevier Science Ltd.

PCT International Search Report; International App. No. PCT/US09/01715; Jan. 8, 2010; pp. 1-2.

Sasaki, Y. Tito; "A survey of vacuum material cleaning procedures: a subcommittee report of the American Vacuum Society Recommended Practices Committee"; The Journal of Vacuum Science and Technology A; Bearing a date of May-Jun. 1991; pp. 2025-2035; vol. 9, No. 3; American Vacuum Society.

U.S. Department of Health and Human Services, Centers for Disease Control and Prevention; "Recommended Immunization Schedule for Persons Aged 0 Through 6 Years—United States"; Bearing a date of 2009; p. 1.

Vesel, Alenka, et al.; "Oxidation of AISI 304L stainless steel surface with atomic oxygen"; Applied Surface Science; Bearing a date of 2002; pp. 94-103; vol. 200; Elsevier Science B.V.

Young, J. R.; "Outgassing Characteristics of Stainless Steel and Aluminum with Different Surface Treatments"; The Journal of Vacuum Science and Technology; Bearing a date of Oct. 14, 1968; pp. 398-400; vol. 6, No. 3.

Zajec, Bojan, et al.; "Hydrogen bulk states in stainless-steel related to hydrogen release kinetics and associated redistribution phenomena"; Vacuum; Bearing a date of 2001; pp. 447-452; vol. 61; Elsevier Science Ltd.

Chen, Dexiang, et al.; "Opportunities and challenges of developing thermostable vaccines"; Expert Reviews Vaccines; 2009; pp. 547-557; vol. 8, No. 5; Expert Reviews Ltd.

Greenbox Systems; "Thermal Management System"; 2010; Printed on: Feb. 3, 2011; p. 1 of 1; located at http://www.greenboxsystems.com.

Matthias, Dipika M., et al.; "Freezing temperatures in the vaccine cold chain: A systematic literature review"; Vaccine; 2007; pp. 3980-3986; vol. 25; Elsevier Ltd.

Pure Temp; "Technology"; Printed on: Feb. 9, 2011; p. 1-3; located at hilp://puretemp.com/technology.html.

Spur Industries Inc.; "The Only Way to Get Them Apart is to Melt Them Apart"; 2006; pp. 1-3; located at http://www.spurind.com/applications.php.

Williams, Preston; "Greenbox Thermal Management System Refrigerate-able 2 to 8 C Shipping Containers"; Printed on: Feb. 9, 2011; p. 1; located at http://www.puretemp.com/documents/Refrigerate-able%202%20to%208%20C%20Shipping%20Containers.pdf.

Wirkas, Theo, et al.; "A vaccine cold chain freezing study in PNG highlights technology needs for hot climate countries"; Vaccine; 2007; pp. 691-697; vol. 25; Elsevier Ltd.

World Health Organization; "Preventing Freeze Damage to Vaccines: Aide-memoire for prevention of freeze damage to vaccines"; 2007; pp. 1-4; WHO/IVB/07.09; World Health Organization.

U.S. Appl. No. 12/927,982, Deane et al.

U.S. Appl. No. 12/927,981, Chou et al.

World Health Organization; "Temperature sensitivity of vaccines"; Department of Immunization, Vaccines and Biologicals, World Health Organization; Aug. 2006; pp. 1-62 plus cover sheet, pp. i-ix, and end sheet (73 pages total); WHO/IVB/06.10; World Health Organization.

Bapat, S. L. et al.; "Experimental investigations of multilayer insulation"; *Cryogenics*; Bearing a date of Aug. 1990; pp. 711-719; vol. 30.

Bapat, S. L. et al.; "Performance prediction of multilayer insulation"; *Cryogenics*; Bearing a date of Aug. 1990; pp. 700-710; vol. 30.

Barth, W. et al.; "Experimental investigations of superinsulation models equipped with carbon paper"; *Cryogenics*; Bearing a date of May 1988; pp. 317-320; vol. 28.

Barth, W. et al.; "Test results for a high quality industrial superinsulation"; *Cryogenics*; Bearing a date of Sep. 1988; pp. 607-609; vol. 28.

Benvenuti, C. et al.; "Obtention of pressures in the $10^{-14}$ torr range by means of a Zr V Fe non evaporable getter"; *Vacuum*; Bearing a date of 1993; pp. 511-513; vol. 44; No. 5-7; Pergamon Press Ltd.

Benvenuti, C.; "Decreasing surface outgassing by thin film getter coatings"; *Vacuum*; Bearing a date of 1998; pp. 57-63; vol. 50; No. 1-2; Elsevier Science Ltd.

Benvenuti, C.; "Nonevaporable getter films for ultrahigh vacuum applications"; *Journal of Vacuum Science Technology a Vacuum Surfaces, and Films*; Bearing a date of Jan./Feb. 1998; pp. 148-154; vol. 16; No. 1; American Chemical Society.

Berman, A.; "Water vapor in vacuum systems"; *Vacuum*; Bearing a date of 1996; pp. 327-332; vol. 47; No. 4; Elsevier Science Ltd.

Bernardini, M. et al.; "Air bake-out to reduce hydrogen outgassing from stainless steel"; *Journal of Vacuum Science Technology*; Bearing a date of Jan./Feb. 1998; pp. 188-193; vol. 16; No. 1; American Chemical Society.

Bo, H. et al.; "Tetradecane and hexadecane binary mixtures as phase change materials (PCMs) for cool storage in district cooling systems"; *Energy*; Bearing a date of 1999; vol. 24; pp. 1015-1028; Elsevier Science Ltd.

Boffito, C. et al.; "A nonevaporable low temperature activatable getter material"; *Journal of Vacuum Science Technology*; Bearing a date of Apr. 1981; pp. 1117-1120; vol. 18; No. 3; American Vacuum Society.

Brown, R.D.; "Outgassing of epoxy resins in vacumm."; *Vacuum*; Bearing a date of 1967; pp. 25-28; vol. 17; No. 9; Pergamon Press Ltd.

Burns, H. D.; "Outgassing Test for Non-metallic Materials Associated with Sensitive Optical Surfaces in a Space Environment"; MSFC-SPEC-1443; Bearing a date of Oct. 1987; pp. 1-10.

Chen, G. et al.; "Performance of multilayer insulation with slotted shield"; *Cryogenics ICEC Supplement*; Bearing a date of 1994; pp. 381-384; vol. 34.

Chen, J. R. et al.; "An aluminum vacuum chamber for the bending magnet of the SRRC synchrotron light source"; *Vacuum*; Bearing a date of 1990; pp. 2079-2081; vol. 41; No. 7-9; Pergamon Press PLC.

(56) References Cited

OTHER PUBLICATIONS

Chen, J. R. et al.; "Outgassing behavior of A6063-EX aluminum alloy and SUS 304 stainless steel"; *Journal of Vacuum Science Technology*; Bearing a date of Nov./Dec. 1987; pp. 3422-3424; vol. 5; No. 6; American Vacuum Society.
Chen, J. R. et al.; "Outgassing behavior on aluminum surfaces: Water in vacuum systems"; *Journal of Vacuum Science Technology*; Bearing a date of Jul./Aug. 1994; pp. 1750-1754; vol. 12; No. 4; American Vacuum Society.
Chen, J. R. et al.; "Thermal outgassing from aluminum alloy vacuum chambers"; *Journal of Vacuum Science Technology*; Bearing a date of Nov./Dec. 1985; pp. 2188-2191; vol. 3; No. 6; American Vacuum Society.
Chen, J. R.; "A comparison of outgassing rate of 304 stainless steel and A6063-EX aluminum alloy vacuum chamber after filling with water"; *Journal of Vacuum Science Technology a Vacuum Surfaces and Film*; Bearing a date of Mar. 1987; pp. 262-264; vol. 5; No. 2; American Chemical Society.
Chiggiato, P.; "Production of extreme high vacuum with non evaporable getters" *Physica Scripta*; Bearing a date of 1997; pp. 9-13; vol. T71.
Cho, B.; "Creation of extreme high vacuum with a turbomolecular pumping system: A baking approach"; *Journal of Vacuum Science Technology*; Bearing a date of Jul./Aug. 1995; pp. 2228-2232; vol. 13; No. 4; American Vacuum Society.
Choi, S. et al.; "Gas permeability of various graphite/epoxy composite laminates for cryogenic storage systems"; *Composites Part B: Engineering*; Bearing a date of 2008; pp. 782-791; vol. 39; Elsevier Science Ltd.
Chun, I. et al.; "Effect of the Cr-rich oxide surface on fast pumpdown to ultrahigh vacuum"; *Journal of Vacuum Science Technology a Vacuum, Surfaces, and Films*; Bearing a date of Sep./Oct. 1997; pp. 2518-2520; vol. 15; No. 5; American Vacuum Society.
Chun, I. et al.; "Outgassing rate characteristic of a stainless-steel extreme high vacuum system"; *Journal of Vacuum Science Technology*; Bearing a date of Jul./Aug. 1996; pp. 2636-2640; vol. 14; No. 4; American Vacuum Society.
Crawley, D J. et al.; "Degassing Characteristics of Some 'O' Ring Materials"; *Vacuum*; Bearing a date of 1963; pp. 7-9; vol. 14; Pergamon Press Ltd.
Csernatony, L.; "The Properties of Viton 'A' Elastomers II. The influence of permeation, diffusion and solubility of gases on the gas emission rate from an O-ring used as an atmospheric seal or high vacuum immersed"; *Vacuum*; Bearing a date of 1965; pp. 129-134; vol. 16; No. 3; Pergamon Press Ltd.
Day, C.; "The use of active carbons as cryosorbent"; *Colloids and Surfaces a Physicochemical and Engineering Aspects*; Bearing a date of 2001; pp. 187-206; vol. 187-188; Elsevier Science.
Della Porta, P.; "Gas problem and gettering in sealed-off vacuum devices"; *Vacuum*; Bearing a date of 1996; pp. 771-777; vol. 47; No. 6-8 Elsevier Science Ltd.
Dylla, H. F. et al.; "Correlation of outgassing of stainless steel and aluminum with various surface treatments"; *Journal of Vacuum Science Technology*; Bearing a date of Sep./Oct. 1993; pp. 2623-2636; vol. 11; No. 5; American Vacuum Society.
Elsey, R. J. "Outgassing of vacuum material I"; *Vacuum*; Bearing a date of 1975; pp. 299-306; vol. 25; No. 7; Pergamon Press Ltd.
Elsey, R. J. "Outgassing of vacuum materials II" *Vacuum*; Bearing a date of 1975; pp. 347-361; vol. 25; No. 8; Pergamon Press Ltd.
Engelmann, G. et al.; "Vacuum chambers in composite material"; *Journal of Vacuum Science Technology*; Bearing a date of Jul./Aug. 1987; pp. 2337-2341; vol. 5; No. 4; American Vacuum Society.
Eyssa, Y. M. et al.; "Thermodynamic optimization of thermal radiation shields for a cryogenic apparatus"; *Cryogenics*; Bearing a date of May 1978; pp. 305-307; vol. 18; IPC Business Press.
Glassford, A. P. M. et al.; "Outgassing rate of multilayer insulation"; 1978; Bearing a date of 1978; pp. 83-106.
Gupta, A. K. et al.; "Outgassing from epoxy resins and methods for its reduction"; *Vacuum*; Bearing a date of 1977; pp. 61-63; vol. 27; No. 12; Pergamon Press Ltd.
Hałaczek, T. et al.; "Flat-plate cryostat for measurements of multilayer insulation thermal conductivity"; *Cryogenics*; Bearing a date of Oct. 1985; pp. 593-595; vol. 25; Butterworth & Co. Ltd.
Hałaczek, T. et al.; "Unguarded cryostat for thermal conductivity measurements of multilayer insulations"; *Cryogenics*; Bearing a date of Sep. 1985; pp. 529-530; vol. 25; Butterworth & Co. Ltd.
Hałaczek, T. L. et al.; "Heat transport in self-pumping multilayer insulation"; *Cryogenics*; Bearing a date of Jun. 1986; pp. 373-376; vol. 26; Butterworth & Co. Ltd.
Hałaczek, T. L. et al.; "Temperature variation of thermal conductivity of self-pumping multilayer insulation"; *Cryogenics*; Bearing a date of Oct. 1986; pp. 544-546.; vol. 26; Butterworth & Co. Ltd.
Halldórsson, Árni, et al.; "The sustainable agenda and energy efficiency: Logistics solutions and supply chains in times of climate change"; *International Journal of Physical Distribution & Logistics Management*; Bearing a date of 2010; pp. 5-13; vol. 40; No. ½; Emerald Group Publishing Ltd.
Halliday, B. S.; "An introduction to materials for use in vacuum"; *Vacuum*; Bearing a date of 1987; pp. 583-585; vol. 37; No. 8-9; Pergamon Journals Ltd.
Hirohata, Y.; "Hydrogen desorption behavior of aluminium materials used for extremely high vacuum chamber"; *Journal of Vacuum Science Technology*; Bearing a date of Sep./Oct. 1993; pp. 2637-2641; vol. 11; No. 5; American Vacuum Society.
Holtrop, K. L. et al.; "High temperature outgassing tests on materials used in the DIII-D tokamak"; *Journal of Vacuum Science Technology*; Bearing a date of Jul./Aug. 2006; pp. 1572-; vol. 24; No. 4; American Vacuum Society.
Hong, S. et al.; "Investigation of gas species in a stainless steel ultrahigh vacuum chamber with hot cathode ionization gauges"; *Measurement Science and Technology*; Bearing a date of 2004; pp. 359-364; vol. 15; IOP Science.
Ishikawa, Y. et al.; "Reduction of outgassing from stainless surfaces by surface oxidation"; *Vacuum*; Bearing a date of 1990; pp. 1995-1997; vol. 4; No. 7-9; Pergamon Press PLC.
Ishikawa, Y.; "An overview of methods to suppress hydrogen outgassing rate from austenitic stainless steel with reference to UHV and EXV"; *Vacuum*; Bearing a date of 2003; pp. 501-512; vol. 69; No. 4; Elsevier Science Ltd.
Ishimaru, H. et al.; "All Aluminum Alloy Vacuum System for the TRISTAN e+ e− Storage"; *IEEE Transactions on Nuclear Science*; Bearing a date of Jun. 1981; pp. 3320-3322; vol. NS-28; No. 3.
Ishimaru, H. et al.; "Fast pump-down aluminum ultrahigh vacuum system"; *Journal of Vacuum Science Technology*; Bearing a date of May/Jun. 1992; pp. 547-552 ; vol. 10; No. 3; American Vacuum Society.
Ishimaru, H. et al.; "Turbomolecular pump with an ultimate pressure of $10^{-12}$ Torr"; *Journal of Vacuum Science Technology*; Bearing a date of Jul./Aug. 1994; pp. 1695-1698; vol. 12; No. 4; American Vacuum Society.
Ishimaru, H.; "All-aluminum-alloy ultrahigh vacuum system for a large-scale electron-positron collider"; *Journal of Vacuum Science Technology*; Bearing a date of Jun. 1984; pp. 1170-1175; vol. 2; No. 2; American Vacuum Society.
Ishimaru, H.; "Aluminium alloy-sapphire sealed window for ultrahigh vacuum"; Vacuum; Bearing a date of 1983; pp. 339-340.; vol. 33; No. 6; Pergamon Press Ltd.
Ishimaru, H.; "Bakeable aluminium vacuum chamber and bellows with an aluminium flange and metal seal for ultra-high vacuum"; *Journal of Vacuum Science Technology*; Bearing a date of Nov./Dec. 1978; pp. 1853-1854; vol. 15; No. 6; American Vacuum Society.
Ishimaru, H.; "Ultimate pressure of the order of $10^{-13}$ Torr in an aluminum alloy vacuum chamber"; *Journal of Vacuum Science and Technology*; Bearing a date of May/Jun. 1989; pp. 2439-2442; vol. 7; No. 3; American Vacuum Society.
Jacob, S. et al.; "Investigations into the thermal performance of multilayer insulation (300-77 K) Part 2: Thermal analysis"; *Cryogenics*; Bearing a date of 1992; pp. 1147-1153; vol. 32; No. 12; Butterworth-Heinemann Ltd.

(56) References Cited

OTHER PUBLICATIONS

Jacob, S. et al.; "Investigations into the thermal performance of multilayer insulation (300-77 K) Part 1: Calorimetric studies"; *Cryogenics*; Bearing a date of 1992; pp. 1137-1146; vol. 32; No. 12; Butterworth-Heinemann Ltd.

Jenkins, C. H. M.; "Gossamer spacecraft: membrane and inflatable structures technology for space applications"; AIAA; Bearing a date of 2000; pp. 503-527; vol. 191.

Jhung, K. H. C. et al.; "Achievement of extremely high vacuum using a cryopump and conflat aluminium"; *Vacuum*; Bearing a date of 1992; pp. 309-311; vol. 43; No. 4; Pergamon Press PLC.

Kato, S. et al.; "Achievement of extreme high vacuum in the order of $10^{-10}$ Pa without baking of test chamber"; *Journal of Vacuum Science Technology*; Bearing a date of May/Jun. 1990; pp. 2860-2864; vol. 8 ; No. 3; American Vacuum Society.

Keller, K. et al.; "Application of high temperature multilayer insulations"; *Acta Astronautica* ; Bearing a date of 1992; pp. 451-458; vol. 26; No. 6; Pergamon Press Ltd.

Koyatsu, Y. et al. "Measurements of outgassing rate from copper and copper alloy chambers"; *Vacuum*; Bearing a date of 1996; pp. 709-711; vol. 4; No. 6-8; Elsevier Science Ltd.

Kristensen, D. et al.; "Stabilization of vaccines: Lessons learned"; *Human Vaccines*; Bearing a date of Mar. 2010; pp. 227-231; vol. 6; No. 3; Landes Bioscience.

Kropschot, R. H.; "Multiple layer insulation for cryogenic applications"; *Cryogenics*; Bearing a date of Mar. 1961; pp. 135-135; vol. 1.

Li, Y.; "Design and pumping characteristics of a compact titanium—vanadium non-evaporable getter pump"; *Journal of Vacuum Science Technology*; Bearing a date of May/Jun. 1998; pp. 1139-1144; vol. 16; No. 3; American Vacuum Society.

Liu, Y. C. et al.; "Thermal outgassing study on aluminum surfaces"; *Vacuum*; Bearing a date of 1993; pp. 435-437; vol. 44; No. 5-7; Pergamon Press Ltd.

Londer, H. et al.; "New high capacity getter for vacuum insulated mobile $LH_2$ storage tank systems"; Vacuum; Bearing a date of 2008; pp. 431-434; vol. 82; No. 4; Elsevier Ltd.

Matsuda, A. et al.; "Simple structure insulating material properties for multilayer insulation"; *Cryogenics*; Bearing a date of Mar. 1980; pp. 135-138; vol. 20; IPC Business Press.

Mikhalchenko, R. S. et al.; "Study of heat transfer in multilayer insulations based on composite spacer materials."; *Cryogenics*; Bearing a date of Jun. 1983; pp. 309-311; vol. 23; Butterworth & Co. Ltd.

Mikhalchenko, R. S. et al.; "Theoretical and experimental investigation of radiative-conductive heat transfer in multilayer insulation"; *Cryogenics*; Bearing a date of May 1985; pp. 275-278; vol. 25; Butterworth & Co. Ltd.

Miki, M. et al.; "Characteristics of extremely fast pump-down process in an aluminum ultrahigh vacuum system"; *Journal of Vacuum Science Technology*; Bearing a date of Jul./Aug. 1994; pp. 1760-1766; vol. 12; No. 4; American Vacuum Society.

Mohri, M. et al.; "Surface study of Type 6063 aluminium alloys for vacuum chamber materials"; *Vacuum*; Bearing a date of 1984; pp. 643-647; vol. 34; No. 6; Pergamon Press Ltd.

Mukugi, K. et al.; "Characteristics of cold cathode gauges for outgassing measurements in uhv range"; *Vacuum*; Bearing a date of 1993; pp. 591-593; vol. 44; No. 5-7; Pergamon Press Ltd.

Nemanič, V. et al.; "Anomalies in kinetics of hydrogen evolution from austenitic stainless steel from 300 to 1000° C."; *Journal of Vacuum Science Technology*; Bearing a date of Jan./Feb. 2001; pp. 215-222; vol. 19; No. 1; American Vacuum Society.

Nemanič, V. et al.; "Outgassing in thin wall stainless steel cells"; *Journal of Vacuum Science Technology*; Bearing a date of May/Jun. 1999; pp. 1040-1046; vol. 17; No. 3; American Vacuum Society.

Nemanič, V.; "Outgassing of thin wall stainless steel chamber"; *Vacuum*; Bearing a date of 1998; pp. 431-437; vol. 50; No. 3-4; Elsevier Science Ltd.

Nemanič, V.; "Vacuum insulating panel"; *Vacuum*; bearing a date of 1995; pp. 839- 842; vol. 46; No. 8-10; Elsevier Science Ltd.

Odaka, K. et al.;"Effect of baking temperature and air exposure on the outgassing rate of type 316L stainless steel"; *Journal of Vacuum Science Technology*; Bearing a date of Sep./Oct. 1987; pp. 2902-2906; vol. 5; No. 5; American Vacuum Society.

Odaka, K.; "Dependence of outgassing rate on surface oxide layer thickness in type 304 stainless steel before and after surface oxidation in air"; *Vacuum*; Bearing a date of 1996; pp. 689-692; vol. 47; No. 6-8; Elsevier Science Ltd.

Okamura, S. et al.; "Outgassing measurement of finely polished stainless steel"; *Journal of Vacuum Science Technology*; Bearing a date of Jul./Aug. 1991; pp. 2405-2407; vol. 9; No. 4; American Vacuum Society.

Patrick, T. J.; "Outgassing and the choice of materials for space instrumentation"; *Vacuum*; Bearing a date of 1973; pp. 411-413; vol. 23; No. 11; Pergamon Press Ltd.

Patrick, T. J.; "Space environment and vacuum properties of spacecraft materials"; *Vacuum*; Bearing a date of 1981; pp. 351-357; vol. 31; No. 8-9; Pergamon Press Ltd.

Poole, K. F. et al.; "Hialvac and Teflon outgassing under ultra-high vacuum conditions"; *Vacuum*; Bearing a date of Jun. 30, 1980; pp. 415-417; vol. 30; No. 10; Pergamon Press Ltd.

Redhead, P. A.; "Recommended practices for measuring and reporting outgassing data"; *Journal of Vacuum Science Technology*; Bearing a date of Sep./Oct. 2002; pp. 1667-1675; vol. 20; No. 5; American Vacuum Society.

Rutherford, S; "The Benefits of Viton Outgassing"; Bearing a date of 1997; pp. 1-5; Duniway Stockroom Corp.

Saito, K. et al.; "Measurement system for low outgassing materials by switching between two pumping paths"; *Vacuum*; Bearing a date of 1996; pp. 749-752; vol. 47; No. 6-8; Elsevier Science Ltd.

Saitoh, M. et al.; "Influence of vacuum gauges on outgassing rate measurements"; *Journal of Vacuum Science Technology*; Bearing a date of Sep./Oct. 1993; pp. 2816-2821; vol. 11; No. 5; American Vacuum Society.

Santhanam, S. M. T. J. et al. ;"Outgassing rate of reinforced epoxy and its control by different pretreatment methods"; *Vacuum*; Bearing a date of 1978; pp. 365-366; vol. 28; No. 8-9; Pergamon Press Ltd.

Sasaki, Y. T.; "Reducing SS 304/316 hydrogen outgassing to $2 \times 10^{-15}$ torr- $1/cm\,^2 s$"; *Journal of Vacuum Science Technology*; Bearing a date of Jul./Aug. 2007; pp. 1309-1311; vol. 25; No. 4; American Vacuum Society.

Scurlock, R. G. et al.; "Development of multilayer insulations with thermal conductivities below 0.1 µW $cm^{-1}$ $K^{-1}$"; *Cryogenics*; Bearing a date of May 1976; pp. 303-311; vol. 16.

Setia, S. et al.; "Frequency and causes of vaccine wastage"; *Vaccine* ; Bearing a date of 2002; pp. 1148-1156; vol. 20; Elsevier Science Ltd.

Shu, Q. S. et al.; "Heat flux from 277 to 77 K through a few layers of multilayer insulation"; *Cryogenics*; Bearing a date of Dec. 1986; pp. 671-677; vol. 26; Butterworth & Co. Ltd.

Shu, Q. S. et al.; "Systematic study to reduce the effects of cracks in multilayer insulation Part 1: Theoretical model"; *Cryogenics*; Bearing a date of May 1987; pp. 249-256; vol. 27; Butterworth & Co. Ltd.

Shu, Q. S. et al.; "Systematic study to reduce the effects of cracks in multilayer insulation Part 2: experimental results"; *Cryogenics*; Bearing a date of Jun. 1987; pp. 298-311; vol. 27; No. 6; Butterworth & Co. Ltd.

Suemitsu, M. et al.; "Development of extremely high vacuums with mirror-polished Al-alloy chambers"; *Vacuum*; Bearing a date of 1993; pp. 425-428; vol. 44; No. 5-7; Pergamon Press Ltd.

Suemitsu, M. et al.; "Ultrahigh-vacuum compatible mirror-polished aluminum-alloy surface: Observation of surface-roughness-correlated outgassing rates"; *Journal of Vacuum Science Technology*; Bearing a date of May/Jun. 1992; pp. 570-572; vol. 10; No. 3; American Vacuum Society.

Tatenuma, K. et al.; "Acquisition of clean ultrahigh vacuum using chemical treatment"; *Journal of Vacuum Science Technology*; Bearing a date of Jul./Aug. 1998; pp. 2693-2697; vol. 16; No. 4; American Vacuum Society.

Tatenuma, K.; "Quick acquisition of clean ultrahigh vacuum by chemical process technology"; *Journal of Vacuum Science Technology*; Bearing a date of Jul./Aug. 1993; pp. 2693-2697; vol. 11; No. 4; American Vacuum Society.

(56) References Cited

OTHER PUBLICATIONS

Tripathi, A. et al.; "Hydrogen intake capacity of ZrVFe alloy bulk getters"; *Vacuum*; Bearing a date of Aug. 6, 1997; pp. 1023-1025; vol. 48; No. 12; Elsevier Science Ltd.

Watanabe, S. et al.; "Reduction of outgassing rate from residual gas analyzers for extreme high vacuum measurements"; *Journal of Vacuum Science Technology*; Bearing a date of Nov./Dec. 1996; pp. 3261-3266; vol. 14; No. 6; American Vacuum Society.

Wiedemann, C. et al.; "Multi-layer Insulation Literatures Review"; *Advances*; Printed on May 2, 2011; pp. 1-10; German Aerospace Center.

Yamazaki, K. et al.; "High-speed pumping to UHV"; *Vacuum* ; Bearing a date of 2010; pp. 756-759; vol. 84; Elsevier Science Ltd.

Zalba, B. et al.; "Review on thermal energy storage with phase change: materials, heat transfer analysis and applications"; *Applied Thermal Engineering*; Bearing a date of 2003; pp. 251-283; vol. 23; Elsevier Science Ltd.

Zhitomirskij, I.S. et al.; "A theoretical model of the heat transfer processes in multilayer insulation"; *Cryogenics*; Bearing a date of May 1979; pp. 265-268; IPC Business Press.

U.S. Appl. No. 13/135,126, Deane et al.

Cabeza, L. F. et al.; "Heat transfer enhancement in water when used as PCM in thermal energy storage"; Applied Thermal Engineering; 2002; pp. 1141-1151; vol. 22; Elsevier Science Ltd.

Chen, Dexiang et al.; "Characterization of the freeze sensitivity of a hepatitis B vaccine"; Human Vaccines; Jan. 2009; pp. 26-32; vol. 5, Issue 1; Landes Bioscience.

Edstam, James S. et al.; "Exposure of hepatitis B vaccine to freezing temperatures during transport to rural health centers in Mongolia"; Preventive Medicine; 2004; pp. 384-388; vol. 39; The Institute for Cancer Prevention and Elsevier Inc.

Efe, Emine et al.; "What do midwives in one region in Turkey know about cold chain?"; Midwifery; 2008; pp. 328-334; vol. 24; Elsevier Ltd.

Günter, M. M. et al.; "Microstructure and bulk reactivity of the nonevaporable getter $Zr_{57}V_{36}Fe_7$"; J. Vac. Sci. Technol. A; Nov./Dec. 1998; pp. 3526-3535; vol. 16, No. 6; American Vacuum Society.

Hipgrave, David B. et al ; "Immunogenicity of a Locally Produced Hepatitis B Vaccine With the Birth Dose Stored Outside the Cold Chain in Rural Vietnam"; Am. J. Trop. Med. Hyg.; 2006; pp. 255-260; vol. 74, No. 2; The American Society of Tropical Medicine and Hygiene.

Hipgrave, David B. et al.; "Improving birth dose coverage of hepatitis B vaccine"; Bulletin of the World Health Organization; Jan. 2006; pp. 65-71; vol. 84, No. 1; World Health Organization.

Hobson, J. P. et al.; "Pumping of methane by St707 at low temperatures"; J. Vac. Sci. Technol. A; May/Jun. 1986; pp. 300-302; vol. 4, No. 3; American Vacuum Society.

Kendal, Alan P. et al.; "Validation of cold chain procedures suitable for distribution of vaccines by public health programs in the USA"; Vaccine; 1997; pp. 1459-1465; vol. 15, No. 12/13; Elsevier Science Ltd.

Khemis, O. et al.; "Experimental analysis of heat transfers in a cryogenic tank without lateral insulation"; Applied Thermal Engineering; 2003; pp. 2107-2117; vol. 23; Elsevier Ltd.

Li, Yang et al.; "Study on effect of liquid level on the heat leak into vertical cryogenic vessels"; Cryogenics; 2010; pp. 367-372; vol. 50; Elsevier Ltd.

Magennis, Teri et al. "Pharmaceutical Cold Chain: A Gap in the Last Mile—Part 1. Wholesaler/Distributer: Missing Audit Assurance"; Pharmaceutical & Medical Packaging News; Sep. 2010; pp. 44, 46-48, and 50; pmpnews.com.

Matolin, V. et al.; "Static SIMS study of TiZrV NEG activation"; Vacuum; 2002; pp. 177-184; vol. 67; Elsevier Science Ltd.

Nelson, Carib M. et al.; "Hepatitis B vaccine freezing in the Indonesian cold chain: evidence and solutions"; Bulletin of the World Health Organization; Feb. 2004; pp. 99-105 (plus copyright page); vol. 82, No. 2; World Health Organization.

Ren, Qian et al.; "Evaluation of an Outside-The-Cold-Chain Vaccine Delivery Strategy in Remote Regions of Western China"; Public Health Reports; Sep.-Oct. 2009; pp. 745-750; vol. 124.

Rogers, Bonnie et al.; "Vaccine Cold Chain—Part 1. Proper Handling and Storage of Vaccine"; AAOHN Journal; 2010; pp. 337-344 (plus copyright page); vol. 58, No. 8; American Association of Occupational Health Nurses, Inc.

Rogers, Bonnie et al.; Vaccine Cold Chain—Part 2. Training Personnel and Program Management; AAOHN Journal; 2010; pp. 391-402 (plus copyright page); vol. 58, No. 9; American Association of Occupational Health Nurses, Inc.

Techathawat, Sirirat et al.; "Exposure to heat and freezing in the vaccine cold chain in Thailand"; Vaccine; 2007; p. 1328-1333; vol. 25; Elsevier Ltd.

Thakker, Yogini et al.; "Storage of Vaccines in the Community: Weak Link in the Cold Chain?"; British Medical Journal; Mar. 21, 1992; pp. 756-758; vol. 304, No. 6829; BMJ Publishing Group.

Wang, Lixia et al.; "Hepatitis B vaccination of newborn infants in rural China: evaluation of a village-based, out-of-cold-chain delivery strategy"; Bulletin of the World Health Organization; Sep. 2007; pp. 688-694; vol. 85, No. 9; World Health Organization.

Wei, Wei et al.; "Effects of structure and shape on thermal performance of Perforated Multi-Layer Insulation Blankets"; Applied Thermal Engineering; 2009; pp. 1264-1266; vol. 29; Elsevier Ltd.

World Health Organization; "Guidelines on the international packaging and shipping of vaccines"; Department of Immunization, Vaccines and Biologicals; Dec. 2005; 40 pages; WHO/IVB/05.23.

Chinese State Intellectual Property Office; First Office Action; App No. 200880119918.0; Jul. 13, 2011.

PCT International Search Report; International App. No. PCT/US11/00234; Jun. 9, 2011; pp. 1-4.

Saes Getters; "St707 Getter Alloy for Vacuum Systems"; printed on Sep. 22, 2011; pp. 1-2; located at htp://www.saegetters.com/default.aspx?idPage=212.

U.S. Appl. No. 13/200,555, Chou et al.

U.S. Appl. No. 13/199,439, Hyde et al.

Chinese State Intellectual Property Office; Office Action; App. No. 200880120366.5; Jun. 27, 2013; 3 pages (no English translation available).

Chinese State Intellectual Property Office; Office Action; App. No. 200880119918.0; May 27, 2013 (received by our agent on May 29, 2013); 9 pages (No English Translation Available).

BINE Informationsdienst; "Zeolite/water refrigerators, Projekt*info* 16/10"; BINE Information Service; printed on Feb. 12, 2013; pp. 1-4; FIZ Karlsruhe, Germany; located at: http://www.bine.info/fileadmin/content/Publikationen/Englische_Infos/projekt_1610_engl_internetx.pdf.

Conde-Petit, Manuel R.; "Aqueous solutions of lithium and calcium chlorides:—Property formulations for use in air conditioning equipment design"; 2009; pp. 1-27 plus two cover pages; M. Conde Engineering, Zurich, Switzerland.

Cool-System Keg GMBH; "Cool-System presents: CoolKeg® The world's first self-chilling Keg!"; printed on Feb. 6, 2013; pp. 1-5; located at: http://www.coolsystem.de/.

U.S. Appl. No. 13/853,245, Eckhoff et al.

Dawoud, et al.; "Experimental study on the kinetics of water vapor sorption on selective water sorbents, silica gel and alumina under typical operating conditions of sorption heat pumps"; International Journal of Heat and Mass Transfer; 2003; pp. 273-281; vol. 46; Elsevier Science Ltd.

Dometic S.A.R.L.; "Introduction of Zeolite Technology into refrigeration systems, LIFE04 ENV/LU/000829, Layman's Report"; printed on Feb. 6, 2013; pp. 1-10; located at: http://ec.europa.eu/environment/life/project/Projects/index.cfm?fuseaction=home.showFile&rep=file&fil=LIFE04_ENV_LU_000829_LAYMAN.pdf.

Dow Chemical Company; "Calcium Chloride Handbook: A Guide to Properties, Forms, Storage and Handling"; Aug. 2003; pp. 1-28.

Gast Manufacturing, Inc.; "Vacuum and Pressure Systems Handbook"; printed on Jan. 3, 2013; pp. 1-20; located at: http://www.gastmfg.com/vphb/vphb_s1.pdf.

(56) References Cited

OTHER PUBLICATIONS

Gea Wiegand; "Pressure loss in vacuum lines with water vapour"; printed on March. 13, 2013; pp. 1-2; located at: http://produkte.gea-wiegand.de/GEA/GEACatagory/139/index_en.html.
Hall, Larry D.; "Building Your Own Larry Hall Icyball"; printed on Mar. 27, 2013; pp. 1-4; located at: http://crosleyautoclub.com/IcyBall/HomeBuilt/HallPlans/IB_Directions.html.
Kozubal, et al.; "Desiccant Enhanced Evaporative Air-Conditioning (DEVap): Evaluation of a New Concept in Ultra Efficient Air Conditioning, Technical Report NREL/TP-5500-49722"; National Renewable Energy Laboratory; Jan. 2011; pp. i-vii, 1-60, plus three cover pages and Report Documentation Page.
machine-history.com; "Refrigeration Machines"; printed on Mar. 27, 2013; pp. 1-10; located at: http://www.machine-history.com/Refirgeration%20Machines.
Marquardt, Niels; "Introduction to the Principles of Vacuum Physics"; 1999; pp. 1-24; located at: http://www.cientificosaficionados.com/libros/CERN/vaciol-CERN.pdf.
Modern Mechanix; "Icyball Is Practical Refrigerator for Farm or Camp Use (Aug. 1930)"; bearing a date of Aug. 1930; printed on Mar. 27, 2013; pp. 1-3; located at: http://blog.modernmechanix.com/icyball-is-practical-refrigerator-for-farm-or-camp-use/.
NSM Archive; "Band structure and carrier concentration"; date of Jan. 22, 2004 provided by examiner, printed on Feb. 16, 2013; pp. 1-10, 1 additional page of archive information; located at: http://web.archive.org/20040122200811/http://www.ioffe.rssi.ru/SVA/NSM/Semicond/SiC/bandstr.html.
Oxychem; "Calcium Chloride, A Guide to Physical Properties"; printed on Jan. 3, 2013; pp. 1-9, plus two cover pages and back page; Occidental Chemical Corporation; located at: http://www.cal-chlor.com/PDF/GUIDE-physical-properties.pdf.
Restuccia, et al.; "Selective water sorbent for solid sorption chiller: experimental results and modeling"; International Journal of Refrigeration; 2004; pp. 284-293; vol. 27; Elsevier Ltd and IIR.
Rezk, et al.; "Physical and operating conditions effects on silica gel/water adsorption chiller performance"; Applied Energy; 2012; pp. 142-149; vol. 89; Elsevier Ltd.
Rietschle Thomas; "Calculating Pipe Size & Pressure Drops in Vacuum Systems, Section 9—Technical Reference"; printed on Jan. 3, 2013; pp. 9-5 through 9-7; located at: http://www.ejglobalinc.com/Tech.htm.
Saha, et al.; "A new generation of cooling device employing $CaCl_2$-in-silica gel-water system"; International Journal of Heat and Mass Transfer; 2009; pp. 516-524; vol. 52; Elsevier Ltd.
UOP; "An Introduction to Zeolite Molecular Sieves"; printed on Jan. 10, 2013; pp. 1-20; located at: http://www.eltrex.pl/pdf/karty/adsorbenty/ENG-Introduction%20to%20Zeolite%20Sieves.pdf.
Wang, et al.; "Study of a novel silica gel-water adsorption chiller. Part I. Design and performance prediction"; International Journal of Refrigeration; 2005; pp. 1073-1083; vol. 28; Elsevier Ltd and IIR.
Wikipedia; "Icyball"; Mar. 14, 2013; printed on Mar. 27, 2013; pp. 1-4; located at: http://en.wikipedia.org/wiki/Icyball.
Chinese State Intellectual Property Office; Office Action; App. No. 200880120366.5; Jun. 1, 2012; pp. 1-19 (no English translation available).
Chinese State Intellectual Property Office; Office Action; App. No. 200880120366.5; Feb. 17, 2013; pp. 1-3 (No English Translation Available).
Chinese State Intellectual Property Office; Chinese Office Action; App. No. 200880119777.2; Jan. 7, 2013; pp. 1-12; No English Translation Available.
U.S. Appl. No. 13/720,328, Hyde et al.
U.S. Appl. No. 13/720,256, Hyde et al.
Intellectual Property Office of the People's Republic of China; Office Action; Chinese Application No. 200880119918.0; Dec. 12, 2012; pp. 1-11.
Chinese State Intellectual Property Office; App. No. 200880119777.2; Mar. 30, 2012; pp. 1-10 (no translation available).
Chinese Office Action; Application No. 200880120367.X; Oct. 25, 2012; pp. 1-5; No English Translation Provided.
Winn, Joshua N. et al.; "Omnidirectional reflection from a one-dimensional photonic crystal"; Optics Letters; Oct. 15, 1998; pp. 1573-1575; vol. 23, No. 20; Optical Society of America.
Chinese State Intellectual Property Office; Office Action; Chinese Application No. 200980109399.4; dated Aug. 29, 2012; pp. 1-12 (No translation provided).
U.S. Appl. No. 13/489,058, Bowers et al.
PCT International Search Report; Application No. PCT/US2011/001939; Mar. 27, 2012; pp. 1-2.
U.S. Appl. No. 13/385,088, Hyde et al.
U.S. Appl. No. 13/374,218, Hyde et al.
U.S. Appl. No. 14/098,886, Bloedow et al.
U.S. Appl. No. 14/070,892, Hyde et al.
U.S. Appl. No. 14/070,234, Hyde et al.
Abdul-Wahab et al.; "Design and experimental investigation of portable solar thermoelectric refrigerator"; Renewable Energy; 2009; pp. 30-34; vol. 34; Elsevier Ltd.
Astrain et al.; "Computational model for refrigerators based on Peltier effect application"; Applied Thermal Engineering; 2005; pp. 3149-3162; vol. 25; Elsevier Ltd.
Azzouz et al.; "Improving the energy efficiency of a vapor compression system using a phase change material"; Second Conference on Phase Change Material & Slurry: Scientific Conference & Business Forum; Jun. 15-17, 2005; pp. 1-11; Yverdon-les-Bains, Switzerland.
Chatterjee et al.; "Thermoelectric cold-chain chests for storing/transporting vaccines in remote regions"; Applied Energy; 2003; pp. 415-433; vol. 76; Elsevier Ltd.
Chiu et al.; "Submerged finned heat exchanger latent heat storage design and its experimental verification"; Applied Energy; 2012; pp. 507-516; vol. 93; Elsevier Ltd.
Conway et al.; "Improving Cold Chain Technologies through the Use of Phase Change Material"; Thesis, University of Maryland; 2012; pp. ii-xv and 16-228.
Dai et al.; "Experimental investigation and analysis on a thermoelectric refrigerator driven by solar cells"; Solar Energy Materials & Solar Cells; 2003; pp. 377-391; vol. 77; Elsevier Science B.V.
U.S. Appl. No. 13/907,470, Bowers et al.
U.S. Appl. No. 13/906,909, Bloedow et al.
Ghoshal et al.; "Efficient Switched Thermoelectric Refrigerators for Cold Storage Applications"; Journal of Electronic Materials; 2009; pp. 1-6; doi: 10.1007/s11664-009-0725-3.
Groulx et al.; "Solid-Liquid Phase Change Simulation Applied to a Cylindrical Latent Heat Energy Storage System"; Excerpt from the Proceedings of the COMSOL Conference, Boston; 2009; pp. 1-7.
Jiajitsawat, Somchai; "A Portable Direct-PV Thermoelectric Vaccine Refrigerator with Ice Storage Through Heat Pipes"; Dissertation, University of Massachusetts, Lowell; 2008; three cover pages, pp. ii-x, 1-137.
Kempers et al.; "Characterization of evaporator and condenser thermal resistances of a screen mesh wicked heat pipe"; International Journal of Heat and Mass Transfer; 2008; pp. 6039-6046; vol. 51; Elsevier Ltd.
Mohamad et al.; "An Analysis of Sensitivity Distribution Using Two Differential Excitation Potentials in ECT"; IEEE Fifth International Conference on Sensing Technology; 2011; pp. 575-580; IEEE.
Mohamad et al.; "A introduction of two differential excitation potentials technique in electrical capacitance tomography"; Sensors and Actuators A; 2012; pp. 1-10; vol. 180; Elsevier B.V.
Mughal et al.; "Review of Capacitive Atmospheric Icing Sensors"; The Sixth International Conference on Sensor Technologies and Applications (SENSORCOMM); 2012; pp. 42-47; IARIA.
Omer et al.; "Design optimization of thermoelectric devices for solar power generation"; Solar Energy Materials and Solar Cells; 1998; pp. 67-82; vol. 53; Elsevier Science B.V.
Omer et al.; "Experimental investigation of a thermoelectric refrigeration system employing a phase change material integrated with thermal diode (thermosyphons)"; Applied Thermal Engineering; 2001; pp. 1265-1271; vol. 21; Elsevier Science Ltd.
Oró et al.; "Review on phase change materials (PCMs) for cold thermal energy storage applications"; Applied Energy; 2012; pp. 1-21; doi: 10.1016/j.apenergy.2012.03.058; Elsevier Ltd.

(56) References Cited

OTHER PUBLICATIONS

Owusu, Kwadwo Poku; "Capacitive Probe for Ice Detection and Accretion Rate Measurement: Proof of Concept"; Master of Science Thesis, Department of Mechanical Engineering, University of Manitoba; 2010; pp. i-xi, 1-95.

Peng et al.; "Determination of the optimal axial length of the electrode in an electrical capacitance tomography sensor"; Flow Measurement and Instrumentation; 2005; pp. 169-175; vol. 16; Elsevier Ltd.

Peng et al.; "Evaluation of Effect of Number of Electrodes in ECT Sensors on Image Quality"; IEEE Sensors Journal; May 2012; pp. 1554-1565; vol. 12, No. 5; IEEE.

Riffat et al.; "A novel thermoelectric refrigeration system employing heat pipes and a phase change material: an experimental investigation"; Renewable Energy; 2001; pp. 313-323; vol. 23; Elsevier Science Ltd.

Robak et al.; "Enhancement of latent heat energy storage using embedded heat pipes"; International Journal of Heat and Mass Transfer; 2011; pp. 3476-3483; vol. 54; Elsevier Ltd.

Rodríguez et al.; "Development and experimental validation of a computational model in order to simulate ice cube production in a thermoelectric ice maker"; Applied Thermal Engineering; 2009; one cover page and pp. 1-28; doi: 10.1016/j.applthermaleng.2009.03.005.

Russel et al.; "Characterization of a thermoelectric cooler based thermal management system under different operating conditions"; Applied Thermal Engineering; 2012; two cover pages and pp. 1-29; doi: 10.1016/j.applthermaleng.2012.05.002.

Sharifi et al.; "Heat pipe-assisted melting of a phase change material"; International Journal of Heat and Mass Transfer; 2012; pp. 3458-3469; vol. 55; Elsevier Ltd.

Stampa et al.; "Numerical Study of Ice Layer Growth Around a Vertical Tube"; Engenharia Térmica (Thermal Engineering); Oct. 2005; pp. 138-144; vol. 4, No. 2.

Vián et al.; "Development of a thermoelectric refrigerator with two-phase thermosyphons and capillary lift"; Applied Thermal Engineering; 2008; one cover page and pp. 1-16 doi: 10.1016/j.applthermaleng.2008.09.018.

Ye et al.; "Evaluation of Electrical Capacitance Tomography Sensors for Concentric Annulus"; IEEE Sensors Journal; Feb. 2013; pp. 446-456; vol. 13, No. 2; IEEE.

Yu et al.; "Comparison Study of Three Common Technologies for Freezing-Thawing Measurement"; Advances in Civil Engineering; 2010; pp. 1-10; doi: 10.1155/2010/239651.

Chinese State Intellectual Property Office, Office Action; App. No. 200880119918.0; Sep.18, 2013; pp. 1-10 (no English translation available).

Chinese State Intellectual Property Office, Office Action; App. No. 201180016103.1 (based on PCT Patent Application No. PCT/US2011/000234); Jun. 23, 2014; pp. 1-23.

"About Heat Leak—Comparison"; Technifab Products, Inc.; printed on Jun. 25, 2014; 2 pages; located at www.technifab.com/cryogenic-resource-library/about-heat-leak.html.

PCT International Search Report; International App. No. PCT/US2014/067863; Mar. 27, 2015; pp. 1-3.

* cited by examiner

TEMPERATURE-STABILIZED STORAGE SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/001,757, entitled TEMPERATURE-STABILIZED STORAGE CONTAINERS, naming Roderick A. Hyde; Edward K. Y. Jung; Nathan P. Myhrvold; Clarence T. Tegreene; William H. Gates, III; Charles Whitmer; and Lowell L. Wood, Jr. as inventors, filed Dec. 11, 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/006,088, entitled TEMPERATURE-STABILIZED STORAGE CONTAINERS WITH DIRECTED ACCESS, naming Roderick A. Hyde; Edward K. Y. Jung; Nathan P. Myhrvold; Clarence T. Tegreene; William H. Gates, III; Charles Whitmer; and Lowell L. Wood, Jr. as inventors, filed Dec. 27, 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

Some aspects include at least one substantially thermally sealed storage container, including an outer assembly including one or more sections of ultra efficient insulation material substantially defining at least one thermally sealed storage region, and an inner assembly including one or more interlocks configured to provide controllable egress of a quantity of a material from one or more of the at least one thermally sealed storage region. In addition to the foregoing, other aspects are described in the claims, drawings, and text forming a part of the present disclosure.

Some aspects include at least one substantially thermally sealed storage container, including an outer assembly including one or more sections of ultra efficient insulation material defining at least one substantially thermally sealed storage region, and an inner assembly including one or more interlocks including at least one first selectively operable passageway between one or more of the at least one storage region and at least one intermediate region, one or more interlocks including at least one second selectively operable passageway between the at least one intermediate region and an exterior of the container, and one or more actuators operably coupled to one or more of the at least one first or second selectively operable passageway configured to open or close said passageway. In addition to the foregoing, other aspects are described in the claims, drawings, and text forming a part of the present disclosure.

Some aspects include at least one substantially thermally sealed storage container, including a structural assembly including one or more sections of ultra efficient insulation material primarily defining at least one substantially thermally sealed storage region, and an outlet assembly including one or more outlet channels, wherein the one or more outlet channels are arranged to provide controllable egress of a quantity of a stored material from the at least one storage region, and the one or more outlet channels substantially follow an extended thermal pathway. In addition to the foregoing, other aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
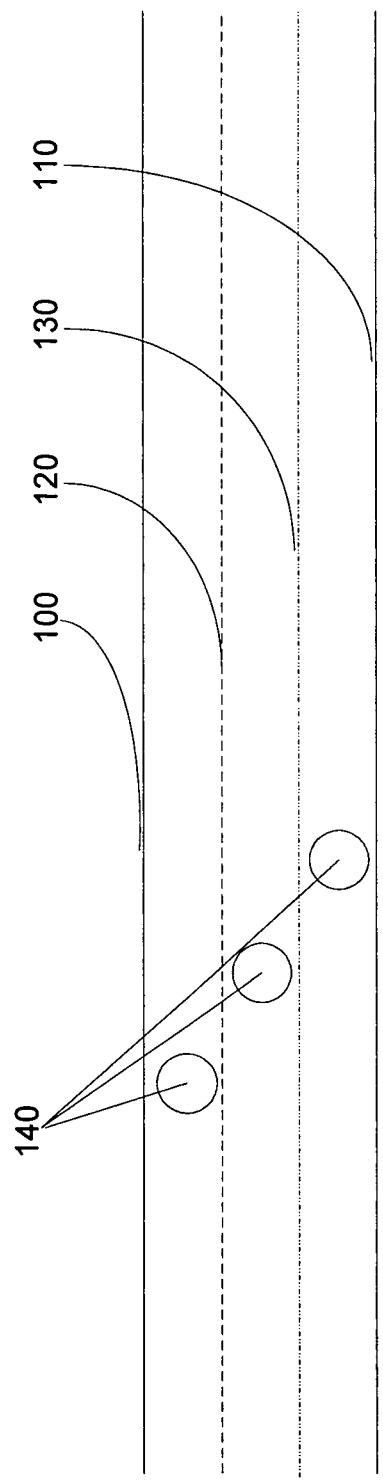
FIG. 1 is a schematic of some aspects of an ultra efficient insulation material.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Some embodiments include at least one substantially thermally sealed storage container, which may include one or more sections of an ultra efficient insulation material. The term "ultra efficient insulation material," as used herein, may include one or more type of insulation material with extremely low heat conductance and extremely low heat radiation transfer between the surfaces of the insulation material. The ultra efficient insulation material may include, for example, one or more layers of thermally reflective film, high vacuum, aerogel, low thermal conductivity bead-like units, disordered layered crystals, low density solids, or low density foam. In some embodiments, the ultra efficient insulation material includes one or more low density solids such as aerogels, such as those described in, for example: Fricke and Emmerling, Aerogels-preparation, properties, applications, Structure and Bonding 77: 37-87 (1992); and Pekala, Organic aerogels from the polycondensation of resorcinol with formaldehyde, Journal of Materials Science 24: 3221-3227 (1989), which are each herein incorporated by reference. As used herein, "low density" may include materials with density from about $0.01$ $g/cm^3$ to about $0.10$ $g/cm^3$, and materials with density from about $0.005$ $g/cm^3$ to about $0.05$ $g/cm^3$. In some embodiments, the ultra efficient insulation material includes one or more layers of disordered layered crystals, such as those described in, for example: Chiritescu et al., Ultralow thermal conductivity in disordered, layered $WSe_2$ crystals, Science 315: 351-353 (2007), which is herein incorporated by reference. In some embodiments, the ultra efficient insulation material includes at least two layers of thermal reflective film separated, for example, by at least one of: high vacuum, low thermal conductivity spacer units, low thermal conductivity bead like units, or low density foam. In some embodiments, the ultra efficient insulation material may include at least two layers of thermal reflective material and at least one spacer unit between the layers of thermal reflective material. For example, the ultra-efficient insulation material may include at least one multiple layer insulating composite such as described in U.S. Pat. No. 6,485,805 to Smith et al., titled "Multilayer insulation composite," which is herein incorporated by reference. For example, the ultra-efficient insulation material may include at least one metallic sheet insulation system, such as that described in U.S. Pat. No. 5,915,283 to Reed et al., titled "Metallic sheet insulation system," which is herein incorporated by reference. For example, the ultra-efficient insulation material may include at least one thermal insulation system, such as that described in U.S. Pat. No. 6,967,051 to Augustynowicz et al., titled "Thermal insulation systems," which is herein incorporated by reference. For example, the ultra-efficient insulation material may include at least one rigid multilayer material for thermal insulation, such as that described in U.S. Pat. No. 7,001,656 to Maignan et al., titled "Rigid multilayer material for thermal insulation," which is herein incorporated by reference.

In some embodiments, an ultra efficient insulation material includes at least one material described above and at least one superinsulation material. As used herein, a "superinsulation material" may include structures wherein at least two floating thermal radiation shields exist in an evacuated double-wall annulus, closely spaced but thermally separated by at least one poor-conducting fiber-like material.

In some embodiments, one or more sections of the ultra efficient insulation material includes at least two layers of thermal reflective material separated from each other by magnetic suspension. The layers of thermal reflective material may be separated, for example, by magnetic suspension methods including magnetic induction suspension or ferromagnetic suspension. For more information regarding magnetic suspension systems, see Thompson, Eddy current magnetic levitation models and experiments, IEEE Potentials, February/March 2000, 40-44, and Post, Maglev: a new approach, Scientific American, January 2000, 82-87, which are each incorporated herein by reference. Ferromagnetic suspension may include, for example, the use of magnets with a Halbach field distribution. For more information regarding Halbach machine topologies and related applications, see Zhu and Howe, Halbach permanent magnet machines and applications: a review, IEE Proc.-Electr. Power Appl. 148: 299-308 (2001), which is herein incorporated by reference.

In reference now to FIG. 1, in some embodiments, an ultra efficient insulation material may include at least one multilayer insulation material. For example, an ultra efficient insulation material may include multilayer insulation material such as that used in space program launch vehicles, including by NASA. See, e.g., Daryabeigi, Thermal analysis and design optimization of multilayer insulation for reentry aerodynamic heating, Journal of Spacecraft and Rockets 39: 509-514 (2002), which is herein incorporated by reference. Some embodiments may include one or more sections of ultra efficient insulation material comprising at least one layer of thermal reflective material and at least one spacer unit adjacent to the at least one layer of thermal reflective material. As illustrated in FIG. 1, an ultra efficient insulation material may include at least two layers of thermal reflective material 120, 130 separated by low thermal conductivity spacer units 140. In some embodiments, one or more sections of ultra efficient insulation material may include at least one layer of thermal reflective material and at least one spacer unit adjacent to the at least one layer of thermal reflective material. The low thermal conductivity spacer units may include, for example, low thermal conductivity bead-like structures, aerogel particles, folds or inserts of thermal reflective film. Although two layers of thermal reflective film are shown in FIG. 1, in some embodiments there may be one layer of thermal reflective film or more than two layers of thermal reflective film. Similarly, there may be greater or fewer numbers of low thermal conductivity spacer units 140 depending on the embodiment. In some embodiments there may be one or more additional layers within or in addition to the ultra efficient insulation material, such as, for example, an outer structural layer 100 or an inner structural layer 110. An inner or an outer structural layer may be made of any material appropriate to the embodiment, for example an inner or an outer structural layer may include: plastic, metal, alloy, composite, or glass. In some embodiments, there may be one or more layers of high vacuum between layers of thermal reflective film.

Some embodiments may include one or more interlocks. As used herein, an "interlock" includes at least one connection between regions, wherein the interlock acts so that the motion or operation of one part is constrained by another. An interlock may be in an open position, allowing the movement of material from one region to another, or an interlock may be in a closed position to restrict the movement or transfer of material. In some embodiments, an interlock may have intermediate stages or intermediate open positions to regulate or control the movement of material. For example, an interlock may have at least one position that restricts egress of a discrete quantity of a material from at least one storage region. For example, an interlock may act to restrict the egress of a stored unit of a material from a storage region until another previously-stored unit of a material egresses from the container. For example, an interlock may act to allow the egress of only a fixed quantity of stored material or stored units of material from a storage region during a period of time. At least one of the one or more interlocks may operate independently of an electrical power source, or at least one of the one or more interlocks may be electrically operable interlocks. An electrical power source may originate, for example, from municipal electrical power supplies, electric batteries, or an electrical generator device. Interlocks may be mechanically operable interlocks. For example, mechanically operable interlocks may include at least one of: electrically actuated mechanically operable interlocks, electromagnetically operable interlocks, magnetically operable interlocks, mechanically actuated interlocks, ballistically actuated interlocks, dynamically actuated interlocks, centrifugally actuated interlocks, optically actuated interlocks, orientationally actuated interlocks, thermally actuated interlocks, or gravitationally actuated interlocks. In some embodiments, at least one of the one or more interlocks includes at least one magnet.

An interlock may operate to allow the transfer or movement of material from one region to another in a unidirectional or a bidirectional manner. For example, an interlock may operate to allow the transfer of material from a storage region within a container to an intermediate region or a region external to the container in a unidirectional manner, while restricting the transfer or movement of material from a region external to the container into the container. For example, an interlock may operate to allow the transfer of material into at least one storage region within a container, such as for refilling or recharging a supply of material stored within the container. For example, an interlock may operate to restrict the egress of stored material from a storage region while allowing for the ingress of a heat sink material such as dry ice, wet ice, liquid nitrogen, or other heat sink material. For example, an interlock may operate to restrict the egress of stored material from a storage region while allowing the ingress of gas or vapor, such as to equalize the gaseous pressure within at least one region within the container with a gaseous pressure external to the container.

Some embodiments include at least one substantially thermally sealed storage container, including an outer assembly including one or more sections of ultra efficient insulation material substantially defining at least one thermally sealed storage region, and an inner assembly including one or more interlocks configured to provide controllable egress of a discrete quantity of a material from one or more of the at least one thermally sealed storage region.

Figure 2:
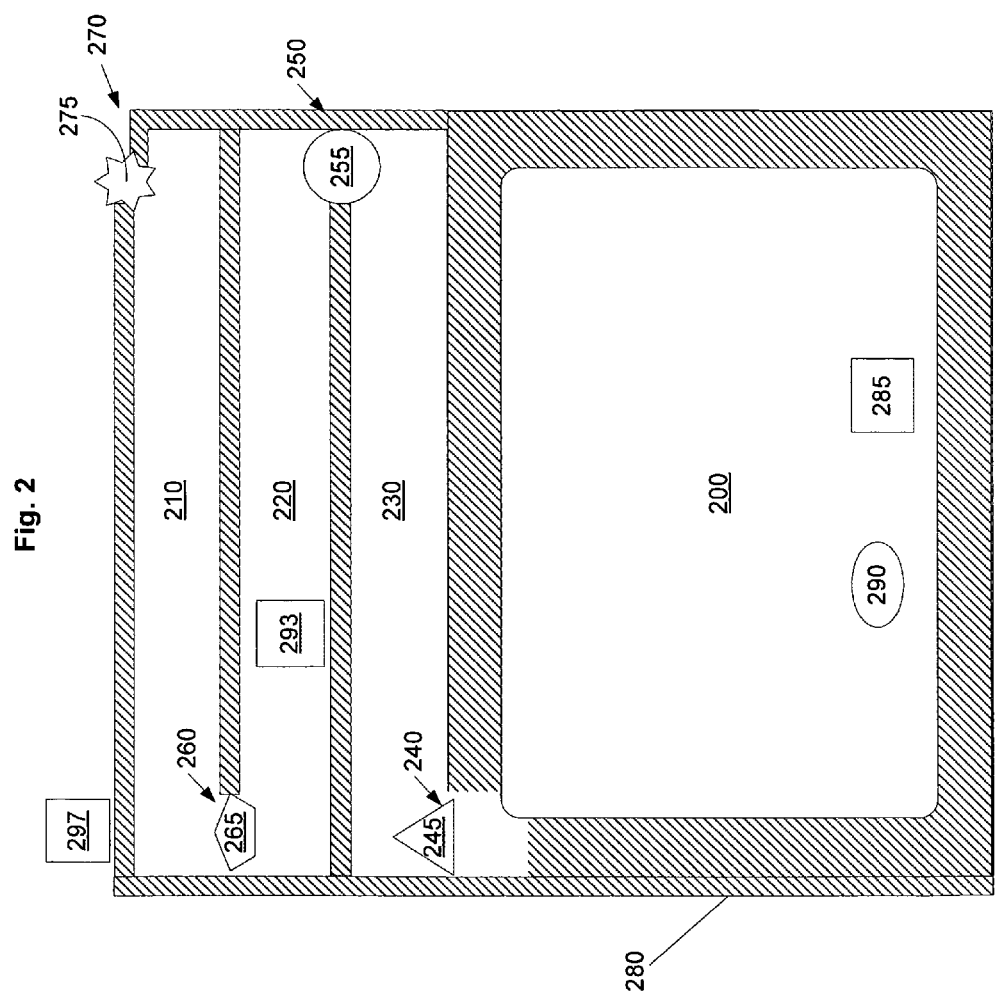
FIG. 2 is a schematic of some aspects of a substantially thermally sealed storage container.

For example, FIG. 2 illustrates an example of a substantially thermally sealed storage container, including an outer assembly 280 substantially defining a thermally sealed storage region 200. FIG. 2 depicts interlocks 245, 255, 265, 275 configured to provide controllable egress of a discrete quantity of material from the storage region 200. Interlocks 245, 255, 265, 275 are configured to provide controllable egress through regions 240, 250, 260 and 270 respectively. In some embodiments, there may be two or more intermediate regions one or more of the at least one substantially thermally sealed storage region of the container and the exterior of the container. The interlocks 245, 255, 265, 275 depicted in FIG. 2 are adjacent to intermediate regions 230, 220, 210. FIG. 2 depicts sensors 293, 297.

Some embodiments include a substantially thermally sealed storage container, including an outer assembly including one or more sections of ultra efficient insulation material defining at least one substantially thermally sealed storage region; and an inner assembly including one or more interlocks including at least one first selectively operable passageway between one or more of the at least one storage region and at least one intermediate region, one or more interlocks including at least one second selectively operable passageway between the at least one intermediate region and an exterior of the container, and one or more actuators operably coupled to one or more of the at least one first or second selectively operable passageway configured to open or close said passageway. At least one of the actuators may be a mechanical actuator. At least one of the one or more actuators operably coupled to at least one of the one or more first or second selectively operable passageway may include at least one of: electrically actuated mechanically operable actuators, electromagnetically operable actuators, magnetically operable actuators, mechanically actuated actuators, ballistically actuated actuators, dynamically actuated actuators, centrifugally actuated actuators, optically actuated actuators, orientationally actuated actuators, thermally actuated actuators, or gravitationally actuated actuators. For example, a magnetically operable actuator may include a magnetic switching component, so that the actuator opens or closes at least one passageway when the container is in proximity to a magnetic field, such as when a magnet is moved across an outer surface of the container. For example, a gravitationally actuated actuator may include at least one component which is weighted so that the actuator opens or closes at least one passageway when the container is in a particular orientation relative to the earth's gravitational field. For example, a gravitationally actuated actuator may close at least one passageway when the container is in an upright orientation and close the at least one passageway when the container is in a sideways orientation.

Figure 3A:
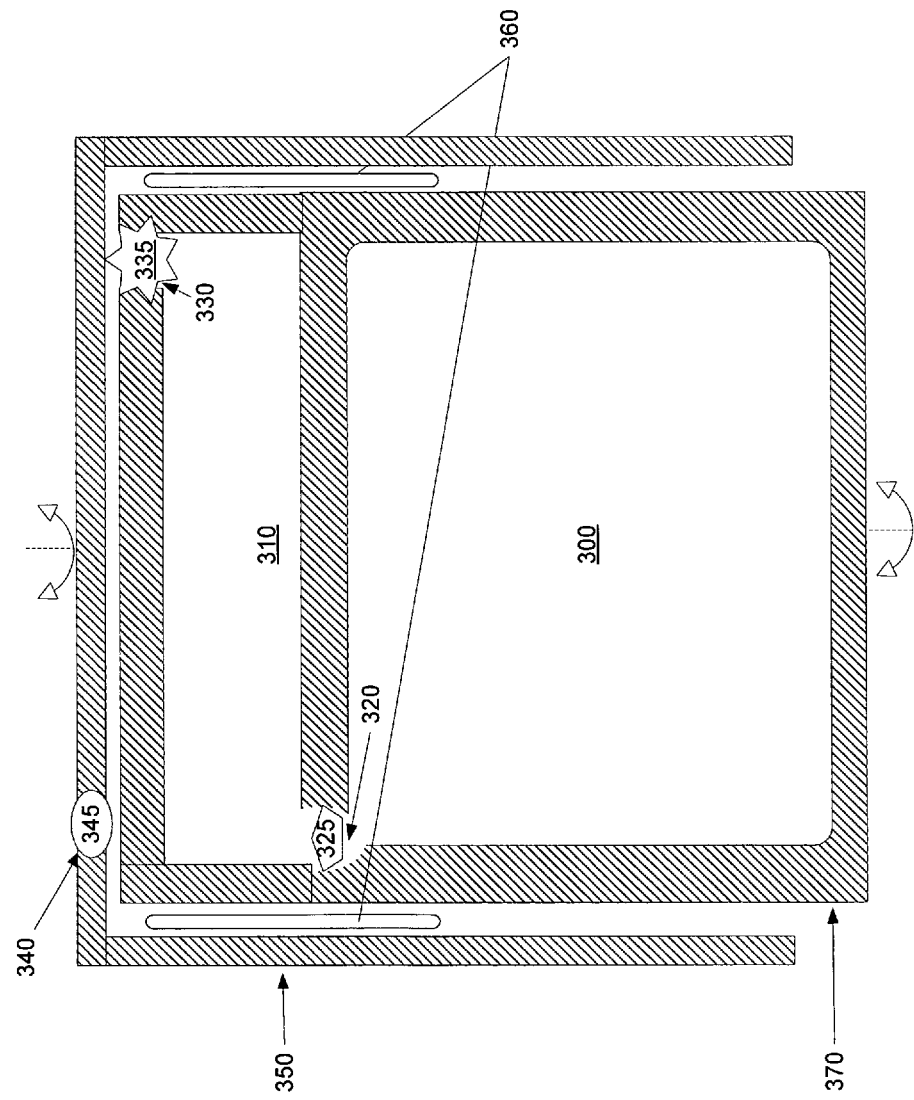
FIG. 3A is a schematic of some aspects of a substantially thermally sealed storage container.
Figure 3B:
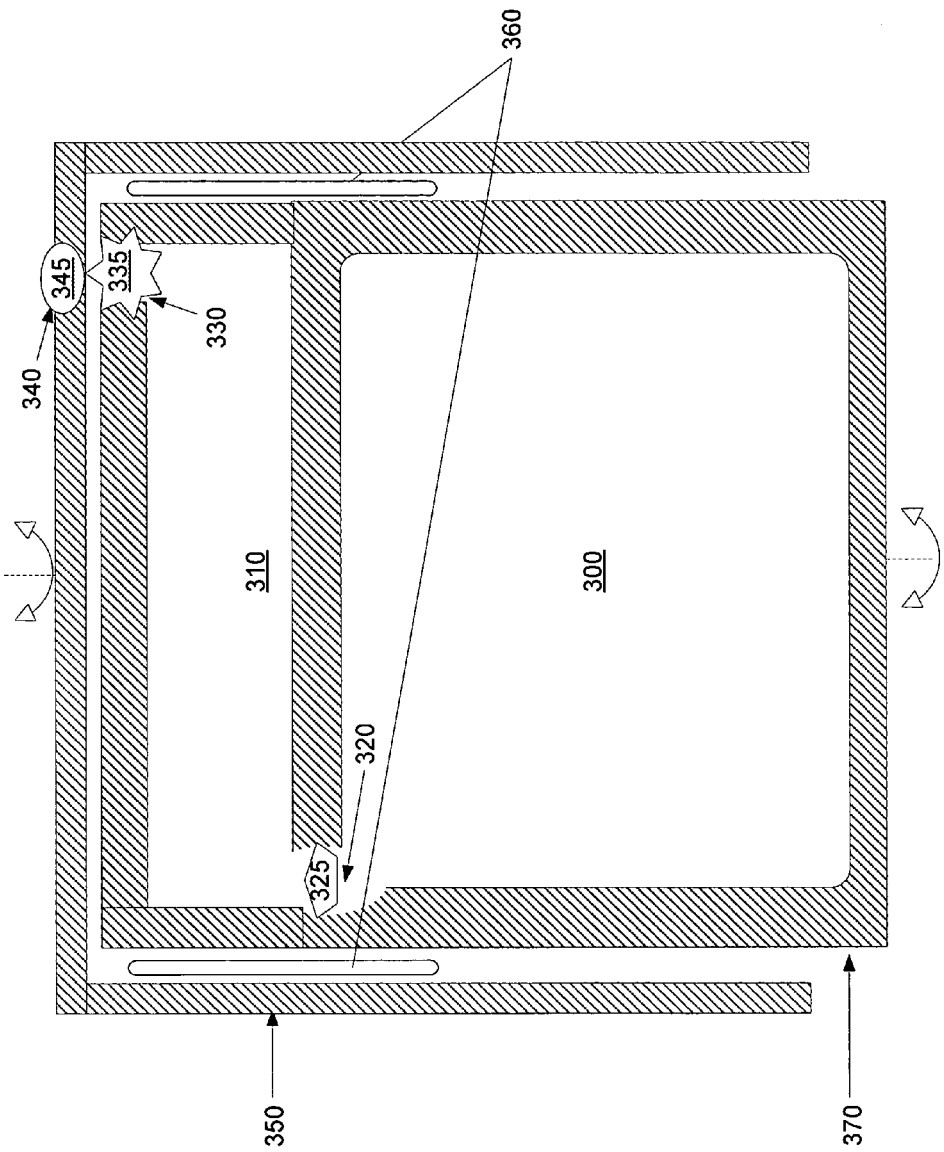
FIG. 3B is a schematic of some aspects of the substantially thermally sealed storage container shown in FIG. 3A.

FIGS. 3A and 3B depicts a substantially thermally sealed storage container including an outer assembly 370 including one or more sections of ultra efficient insulation material substantially defining at least one thermally sealed storage region 300 and an inner assembly including one or more interlocks 325, 335 configured to provide controllable egress of a discrete quantity of a material from one or more of the at least one thermally sealed storage region 300. As depicted in FIGS. 3A and 3B, a container may include a rotatable region 350 which may rotate through a thermally sealed rotation region 360. For example a thermally sealed rotation region 360 may include hinges, curves or grooves to allow for movement of rotatable region 350 around an axis of the at least one thermally sealed storage region 300. Interlock 325 includes a selectively operable passageway 320 between storage region 300 and intermediate region 310. As depicted in FIG. 3B, when the rotatable region 350 is in a position to allow for alignment of interlock 335 with mechanical actuator 345, mechanical actuator 345 may be operably coupled to the selectively operable passageway formed by regions 330, 340 between intermediate region 310 and the exterior of the container. As depicted in FIG. 3A, rotatable region 350 also may be in a position to not allow alignment of interlock 335 with mechanical actuator 345. Rotatable region 350 may therefore include an externally-operable closure operably coupled to one or more of the at least one second selectively operable passageway. As may be readily apparent from FIGS. 3A and 3B, material stored in the storage region may include liquids, fluids, semi-fluids, solids, semi-solids, particulates, smaller storage material units (e.g. one or more packaged material units), or smaller storage containers.

Figure 4:
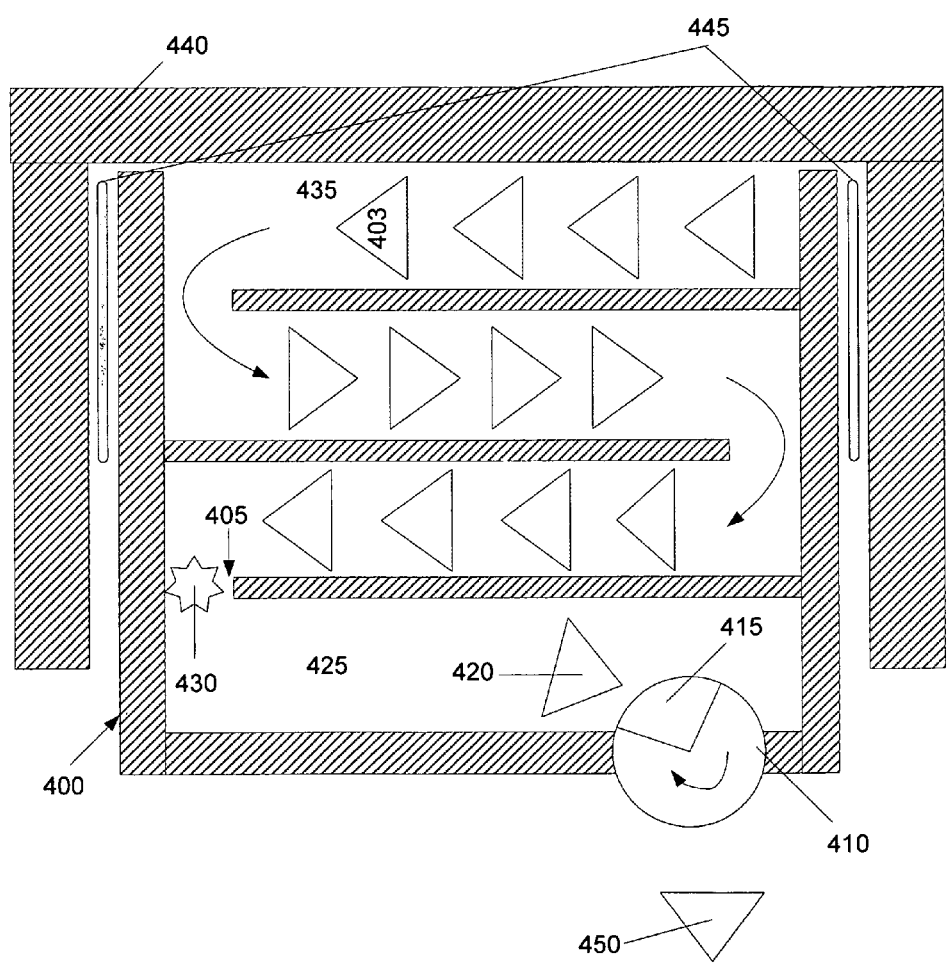
FIG. 4 is a schematic of some aspects of a substantially thermally sealed storage container.

FIG. 4 depicts a substantially thermally sealed storage container with an outer assembly including sections of ultra efficient insulation material 400, 440 substantially defining a substantially thermally sealed storage region 435, and an inner assembly including one or more interlocks 410 configured to provide controllable egress of a quantity of material (as depicted by triangles e.g. 403) from the storage region 435. The container depicted in FIG. 4 includes sections of ultra efficient insulation material 400, 440 attached via thermally insulating attachment regions 445. FIG. 4 depicts a passageway 405 between storage region 435 and intermediate region 425. The movement of stored material 403 though passageway 405 may be controlled by closure 430. In some embodiments, closure 430 may be externally-operable, for example via remote electronic control, remote magnetic control or shifting the alignment of the container relative to the earth's gravitational field. Material 420 in the intermediate region 425 may have controllable egress from intermediate region 425 via interlock 410. As depicted in FIG. 4, material 420 may align with an appropriately sized and shaped region 415 of interlock 410, and interlock 410 may then rotate to allow for the egress of material (e.g. 450). Interlock 410 may be externally-operable, for example the rotation of interlock 410 may be via mechanical force, magnetic force, gravitational force, thermal energy, optical force, dynamic force or electromagnetic force, or other externally-operable forces. Although FIG. 4 illustrates multiple discrete units stored in the storage region 435, in some embodiments there may be a liquid, fluid, multiple material units of different size, multiple material units of different shape, or a single material unit stored in storage region 435.

Figure 5B:
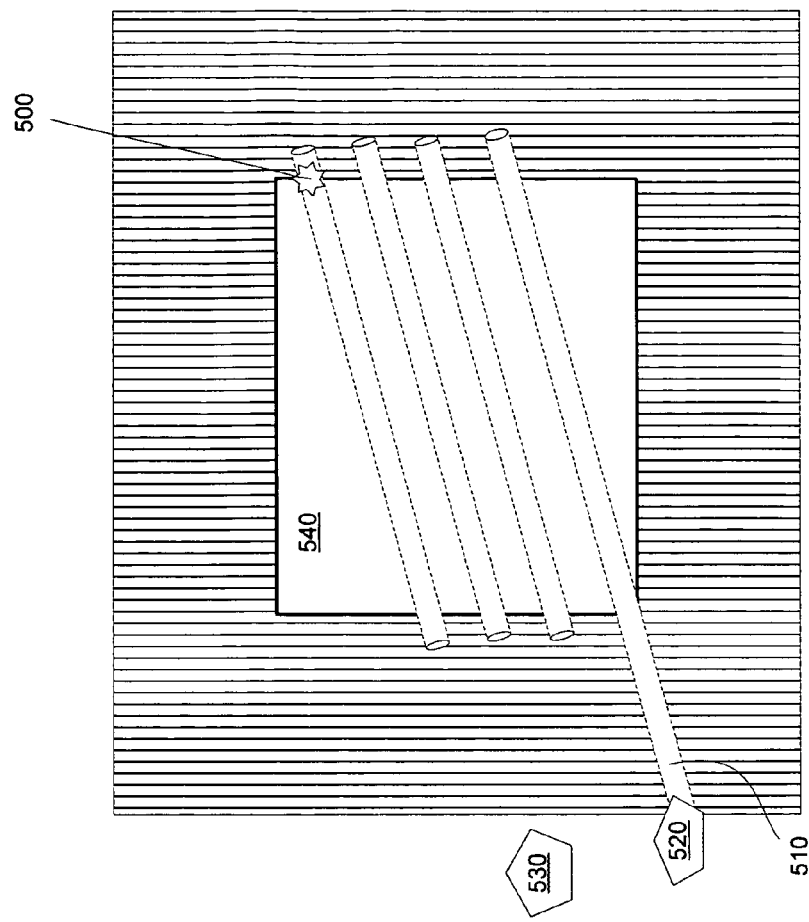
FIG. 5B is a schematic of a side-facing "cross-section" view of the substantially thermally sealed storage container shown in FIG. 5A.
Figure 5A:
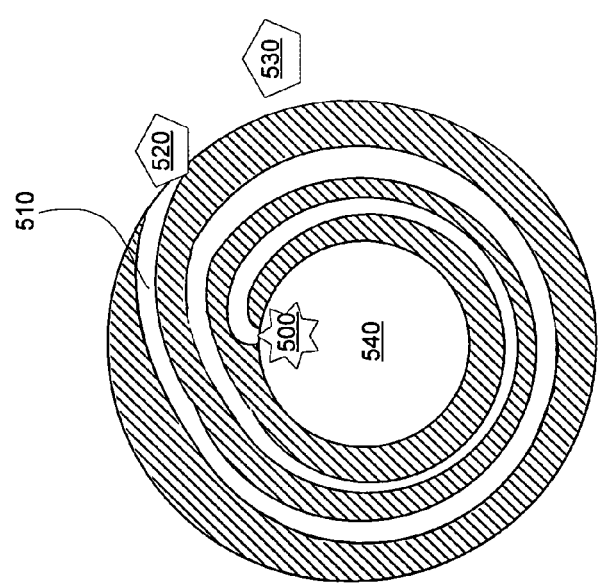
FIG. 5A is a schematic of a "top-down" view of a substantially thermally sealed storage container showing some aspects of the container.
Figure 5C:
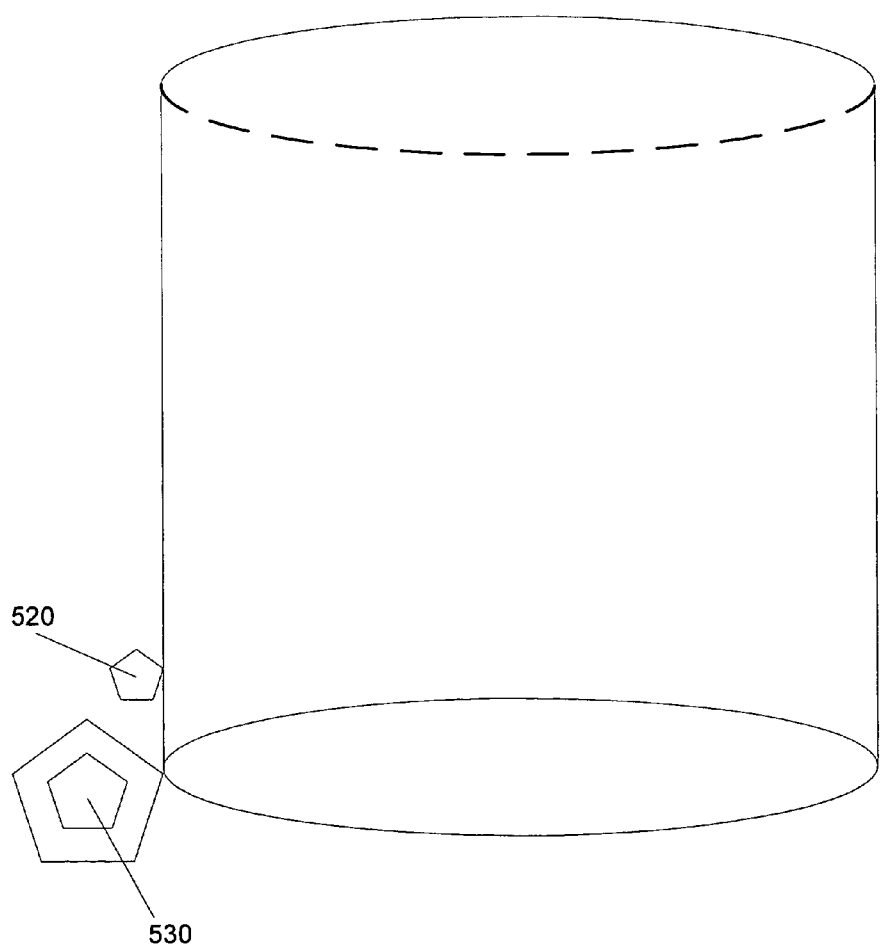
FIG. 5C is a schematic of a side-facing exterior view of the substantially thermally sealed storage container shown in FIGS. 5A and 5B.

In some embodiments, a substantially thermally sealed storage container includes a structural assembly including one or more sections of ultra efficient insulation material primarily defining at least one substantially thermally sealed storage region, and an outlet assembly including one or more outlet channels, wherein the one or more outlet channels are arranged to provide controllable egress of a quantity of a stored material from the at least one storage region, and the one or more outlet channels substantially follow an extended thermal pathway. For example, an extended thermal pathway may have a high aspect ratio. For example, as illustrated in FIG. 5, views 5A, 5B and 5C, a substantially thermally sealed container includes an outlet channel 510 to provide controllable egress of a quantity of a stored material from the at least one storage region 540. View 5A depicts a top-down cross-section view of a container, view 5B depicts a side-facing cross-section view of the container, and view 5C depicts an external side-facing view of the container. In some embodiments, a substantially thermally sealed container includes at least one externally-controllable opening between at least one of the one or more outlet channels and one or more of the at least one storage region. For example, FIG. 5 shows a substantially thermally sealed container including an outlet channel 510 and a externally-controllable opening 500 between the outlet channel and one or more of the at least one storage region 540. In some embodiments, a substantially thermally sealed container includes at least one externally-controllable opening between at least one of the one or more outlet channels and the exterior of the container. For example, FIG. 5 shows a substantially thermally sealed container including an outlet channel 510 and an externally-controllable opening 520 between the outlet channel and the exterior of the container. A container may include a sealable closure 530 for an externally-controllable opening 520.

As shown in FIGS. 2, 3, 4 and 5, some embodiments include a substantially thermally sealed storage container that includes no active cooling units. The term "active cooling unit," as used herein, includes conductive and radiative cooling mechanisms that require electricity from an external source to operate. For example, active cooling units may include one or more of: actively powered fans, actively pumped refrigerant systems, thermoelectric systems, active heat pump systems, active vapor-compression refrigeration systems and active heat exchanger systems. The external energy required to operate such mechanisms may originate, for example, from municipal electrical power supplies or electric batteries.

In some embodiments the substantially thermally sealed storage container may include one or more heat sink units thermally connected to one or more of the at least one storage region. For example, as illustrated in FIG. 2, in some embodiments the substantially thermally sealed storage container may include one or more heat sink units 290 thermally connected to one or more of the at least one thermally sealed storage region 200. In some embodiments, the substantially thermally sealed storage container may include no heat sink units. In some embodiments, the substantially thermally sealed storage container may include no heat sink units within the interior of the container. The term "heat sink unit," as used herein, includes one or more units that absorb thermal energy. See, for example, U.S. Pat. No. 5,390,734 to Voorhes et al., titled "Heat Sink," U.S. Pat. No. 4,057,101 to Ruka et al., titled "Heat Sink," U.S. Pat. No. 4,003,426 to Best et al., titled "Heat or Thermal Energy Storage Structure," and U.S. Pat. No. 4,976,308 to Faghri titled "Thermal Energy Storage Heat Exchanger," which are each incorporated herein by reference. Heat sink units may include, for example: units containing frozen water or other types of ice; units including frozen material that is generally gaseous at ambient temperature and pressure, such as frozen carbon dioxide ($CO_2$); units including liquid material that is generally gaseous at ambient temperature and pressure, such as liquid nitrogen; units including artificial gels or composites with heat sink properties; units including phase change materials; and units including refrigerants. See, for example: U.S. Pat. No. 5,261,241 to Kitahara et al., titled "Refrigerant," U.S. Pat. No. 4,810,403 to Bivens et al., titled "Halocarbon Blends for Refrigerant Use," U.S. Pat. No. 4,428,854 to Enjo et al., titled "Absorption Refrigerant Compositions for Use in Absorption Refrigeration Systems," and U.S. Pat. No. 4,482,465 to Gray, titled "Hydrocarbon-Halocarbon Refrigerant Blends," which are each herein incorporated by reference.

In some embodiments, a substantially thermally sealed container includes at least one layer of nontoxic material on an interior surface of one or more of the at least one thermally sealed storage region. Nontoxic material may include, for example, material that does not produce residue that may be toxic to the contents of the at least one substantially thermally sealed storage region, or material that does not produce residue that may be toxic to the future users of contents of the at least one substantially thermally sealed storage region. Nontoxic material may include material that maintains the chemical structure of the contents of the at least one substantially thermally sealed storage region, for example nontoxic material may include chemically inert or non-reactive materials. Nontoxic material may include material that has been developed for use in, for example, medical, pharmaceutical or food storage applications. Nontoxic material may include material that may be cleaned or sterilized, for example material that may be irradiated, autoclaved, or disinfected. Nontoxic material may include material that contains one or more antibacterial, antiviral, antimicrobial, or antipathogen agents. For example, nontoxic material may include aldehydes, hypochlorites, oxidizing agents, phenolics, quaternary ammonium compounds, or silver. Nontoxic material may include material that is structurally stable in the presence of one or more cleaning or sterilizing compounds or radiation, such as plastic that retains its structural integrity after irradiation, or metal that does not oxidize in the presence of one or more cleaning or sterilizing compounds. Nontoxic material may include material that consists of multiple layers, with layers removable for cleaning or sterilization, such as for reuse of the at least one substantially thermally sealed storage region. Nontoxic material may include, for example, material including metals, fabrics, papers or plastics.

In some embodiments, a substantially thermally sealed container includes at least one layer including at least one metal on an interior surface of one or more of the at least one thermally sealed storage region. For example, the at least one metal may include gold, aluminum, copper, or silver. The at least one metal may include at least one metal composite or alloy, for example steel, stainless steel, metal matrix composites, gold alloy, aluminum alloy, copper alloy, or silver alloy. In some embodiments, the at least one metal includes metal foil, such as titanium foil, aluminum foil, silver foil, or gold foil. A metal foil may be a component of a composite, such as, for example, in association with polyester film, such as polyethylene terephthalate (PET) polyester film. The at least one layer including at least one metal on the interior surface of at least one storage region may include at least one metal that may be sterilizable or disinfected. For example, the at least one metal may be sterilizable or disinfected using plasmons. For example, the at least one metal may be sterilizable or disinfected using autoclaving, thermal means, or chemical means. Depending on the embodiment, the at least one layer including at least one metal on the interior surface of at least one storage region may include at least one metal that has specific heat transfer properties, such as a thermal radiative properties.

In some embodiments, a substantially thermally sealed storage container includes one or more removable inserts within an interior of one or more of the at least one thermally sealed storage region. The removable inserts may be made of any material appropriate for the embodiment, including nontoxic materials, metal, alloy, composite, or plastic. The one or more removable inserts may include inserts that may be reused or reconditioned. The one or more removable inserts may include inserts that may be cleaned, sterilized, or disinfected as appropriate to the embodiment.

In some embodiments, there may be a substantially thermally sealed storage container including a plurality of storage regions within the container. In some embodiments, the outer assembly including one or more sections of ultra efficient insulation material substantially defines a plurality of thermally sealed storage regions. The plurality of storage regions may be, for example, of comparable size and shape or they may be of differing sizes and shapes as appropriate to the embodiment. Different storage regions may include, for example, various removable inserts, at least one layer including at least one metal on the interior surface of a storage region, or at least one layer of nontoxic material on the interior surface, in any combination or grouping.

Some embodiments may include a substantially thermally sealed storage container including one or more temperature indicators. For example, at least one temperature indicator may be located within one or more of the at least one substantially thermally sealed storage region, at least one temperature indicator may be located exterior to the container, or at least one temperature indicator may be located within the structure of the container. In some embodiments, multiple temperature indicators may be located in multiple positions. Temperature indicators may include temperature indicating labels, which may be reversible or irreversible. See, for example, the Environmental Indicators sold by ShockWatch Company, with headquarters in Dallas Tex., the Temperature Indicators sold by Cole-Palmer Company of Vernon Hills Illinois and the Time Temperature Indicators sold by 3M Company, with corporate headquarters in St. Paul Minn., the brochures for which are each hereby incorporated by reference. Temperature indicators may include time-temperature indicators, such as those described in U.S. Pat. Nos. 5,709,472 and 6,042,264 to Prusik et al., titled "Time-temperature indicator device and method of manufacture" and U.S. Pat. No. 4,057,029 to Seiter, titled "Time-temperature indicator," which are each herein incorporated by reference. Temperature indicators may include, for example, chemically-based indicators, temperature gauges, thermometers, bimetallic strips, or thermocouples.

In some embodiments, a substantially thermally sealed container may include one or more sensors. As illustrated in FIG. 2, in some embodiments, an integrally thermally sealed container may include one or more sensors 285, 293, 297. At least one sensor 285 may be located within one or more of the at least one substantially thermally sealed storage region, at least one sensor 297 may be located exterior to the container, or at least one sensor 293 may be located within the structure of the container. In some embodiments, multiple sensors may be located in multiple positions. In some embodiments, the one or more sensors includes at least one sensor of a gaseous pressure within one or more of the at least one storage region, sensor of a mass within one or more of the at least one storage region, sensor of a stored volume within one or more of the at least one storage region, sensor of a temperature within one or more of the at least one storage region, or sensor of an identity of an item within one or more of the at least one storage region. In some embodiments, at least one sensor may include a temperature sensor, such as, for example, chemical sensors, thermometers, bimetallic strips, or thermocouples. An integrally thermally sealed container may include one or more sensors such as a physical sensor component such as described in U.S. Pat. No. 6,453,749 to Petrovic et al., titled "Physical sensor component," which is herein incorporated by reference. An integrally thermally sealed container may include one or more sensors such as a pressure sensor such as described in U.S. Pat. No. 5,900,554 to Baba et al., titled "Pressure sensor," which is herein incorporated by reference. An integrally thermally sealed container may include one or more sensors such as a vertically integrated sensor structure such as described in U.S. Pat. No. 5,600,071 to Sooriakumar et al., titled "Vertically integrated sensor structure and method," which is herein incorporated by reference. An integrally thermally sealed container may include one or more sensors such as a system for determining a quantity of liquid or fluid within a container, such as described in U.S. Pat. No. 5,138,559 to Kuehl et al., titled "System and method for measuring liquid mass quantity," U.S. Pat. No. 6,050,598 to Upton, titled "Apparatus for and method of monitoring the mass quantity and density of a fluid in a closed container, and a vehicular air bag system incorporating such apparatus," and U.S. Pat. No. 5,245,869 to Clarke et al., titled "High accuracy mass sensor for monitoring fluid quantity in storage tanks," which are each herein incorporated by reference. An integrally thermally sealed container may include one or more sensors of radio frequency identification ("RFID") tags to identify material within the at least one substantially thermally sealed storage region. RFID tags are well known in the art, for example in U.S. Pat. No. 5,444,223 to Blama, titled "Radio frequency identification tag and method," which is herein incorporated by reference.

In some embodiments, a substantially thermally sealed container may include one or more communications devices. The one or more communications devices, may include, for example, one or more recording devices, one or more transmission devices, one or more display devices, or one or more receivers. Communications devices may include, for example, communication devices that allow a user to detect information about the container visually, auditorily, or via signal to a remote device. Some embodiments may include communications devices on the exterior of the container, including devices attached to the exterior of the container, devices adjacent to the exterior of the container, or devices located at a distance from the exterior of the container. Some embodiments may include communications devices located within the structure of the container. Some embodiments may include communications devices located within at least one of the one or more substantially thermally sealed storage regions. Some embodiments may include at least one display device located at a distance from the container, for example a display located at a distance operably linked to at least one sensor. Some embodiments may include more than one type of communications device, and in some embodiments the devices may be operably linked. For example, some embodiments may contain both a receiver and an operably linked transmission device, so that a signal may be received by the receiver which then causes a transmission to be made from the transmission device. Some embodiments may include more than one type of communications device that are not operably linked. For example, some embodiments may include a transmission device and a display device, wherein the transmission device is not linked to the display device.

In some embodiments, there may be at least one region within an interior of a substantially thermally sealed storage container that is at a higher gaseous pressure than the atmospheric pressure external to the container. In some embodiments, there may be at least one compartment within one or more of the at least one substantially thermally sealed storage region, wherein the at least one compartment is at a higher gaseous pressure than the exterior atmospheric pressure of the container. For example, in reference to FIGS. 2 and 3, the gaseous pressure in a storage region 200, 300, or within intermediate regions 210, 220, 230, or 310 may be at a higher gaseous pressure than the atmospheric pressure external to the container. For example, a region of higher gaseous pressure may include a sealed region with inherently higher gaseous pressure. For example, a region of higher gaseous pressure may include at least one storage region 200, 300 including positive gaseous pressure relative to the atmospheric pressure external to the container. For example, a region of higher gaseous pressure may include at least one storage region 200, 300 including one or more sealed storage units with interior positive gaseous pressure relative to the atmospheric pressure external to the container. In some embodiments, there may be at least one region within the interior of the container that is at a lower atmospheric pressure than the atmospheric pressure external to the container. For example, in reference to FIGS. 2 and 3, the gaseous pressure in a storage region 200, 300, or within regions 210, 220, 230, or 310 may be at a lower gaseous pressure than the atmospheric pressure external to the container. For example, a region of lower gaseous pressure may include at least one storage region 200, 300 including negative gaseous pressure relative to the atmospheric pressure external to the container. For example, a region of lower gaseous pressure may include at least one storage region 200, 300 including one or more sealed storage units with interior negative gaseous pressure relative to the atmospheric pressure external to the container.

In some embodiments, a substantially thermally sealed storage container includes at least one authentication device, wherein the at least one authentication device may be operably connected to at least one of the one or more interlocks. In some embodiments, a substantially thermally sealed storage container includes at least one authentication device, wherein the at least one authentication device may be operably connected to at least one externally-operable opening, control egress device, communications device, or other component. For example, an authentication device may include a device which may be authenticated with a key, or a device that may be authenticated with a code, such as a password or a combination. For example, an authentication device may include a device that may be authenticated using biometric parameters, such as fingerprints, retinal scans, hand spacing, voice recognition or biofluid composition (e.g. blood, sweat, or saliva).

In some embodiments, a substantially thermally sealed storage container includes at least one logging device, wherein the at least one logging device is operably connected to at least one of the one or more interlocks. In some embodiments, a substantially thermally sealed storage container includes at least one logging device, wherein the at least one logging device may be operably connected to at least one externally-operable opening, control egress device, communications device, or other component. The at least one logging device may be configured to log information desired by the user. In some embodiments, a substantially thermally sealed container may include at least one logging device, wherein the at least one logging device is operably connected to at least one of the one or more outlet channels. For example, a logging device may include a record of authentication via the authentication device, such as a record of times of authentication, operation of authentication or individuals making the authentication. For example, a logging device may record that an authentication device was authenticated with a specific code which identifies a specific individual at one or more specific times. For example, a logging device may record egress of a quantity of a material from one or more of at least one storage region, such as recording that some quantity or units of material egressed at a specific time. For example, a logging device may record information from one or more sensors, one or more temperature indicators, or one or more communications devices.

In some embodiments, a substantially thermally sealed storage container may include at least one control ingress device, wherein the at least one control ingress device is operably connected to at least one of the one or more interlocks. In some embodiments, a substantially thermally sealed storage container includes at least one control ingress device, wherein the at least one control ingress device may be operably connected to at least one externally-operable opening, control egress device, communications device, or other component. For example, at least one control ingress device may control ingress into the inner assembly of the container, such as ingress of: substance or material to be stored, heat sink material, one or more devices, electromagnetic radiation, gas, or vapor.

In some embodiments an integrally thermally sealed container may include one or more recording devices. The one or more recording devices may include devices that are magnetic, electronic, chemical, or transcription based recording devices. One or more recording device may be located within one or more of the at least one substantially thermally sealed storage region, one or more recording device may be located exterior to the container, or one or more recording device may be located within the structure of the container. The one or more recording device may record, for example, the temperature from one or more temperature sensor, the result from one or more temperature indicator, or the gaseous pressure, mass, volume or identity of an item information from at least one sensor within the at least one storage region. In some embodiments, the one or more recording devices may be integrated with one or more sensor. For example, in some embodiments there may be one or more temperature sensors which record the highest, lowest or average temperature detected. For example, in some embodiments, there may be one or more mass sensors which record one or more mass changes within the container over time. For example, in some embodiments, there may be one or more gaseous pressure sensors which record one or more gaseous pressure changes within the container over time.

In some embodiments an integrally thermally sealed container may include one or more transmission device. One or more transmission device may be located within at least one substantially thermally sealed storage region, one or more transmission device may be located exterior to the container, or one or more transmission device may be located within the structure of the container. The one or more transmission device may transmit any signal or information, for example, the temperature from one or more temperature sensor, or the gaseous pressure, mass, volume or identity of an item or information from at least one sensor within the at least one storage region. In some embodiments, the one or more transmission device may be integrated with one or more sensor, or one or more recording device. The one or more transmission devices may transmit by any means known in the art, for example, but not limited to, via radio frequency (e.g. RFID tags), magnetic field, electromagnetic radiation, electromagnetic waves, sonic waves, or radioactivity.

In some embodiments, an integrally thermally sealed container may include one or more receivers. For example, one or more receivers may include devices that detect sonic waves, electromagnetic waves, radio signals, electrical signals, magnetic pulses, or radioactivity. Depending on the embodiment, one or more receiver may be located within one or more of the at least one substantially thermally sealed storage region. In some embodiments, one or more receivers may be located within the structure of the container. In some embodiments, the one or more receivers may be located on the exterior of the container. In some embodiments, the one or more receiver may be operably coupled to another device, such as for example one or more display devices, recording devices or transmission devices. For example, a receiver may be operably coupled to a display device on the exterior of the container so that when an appropriate signal is received, the display device indicates data, such as time or temperature data. For example, a receiver may be operable coupled to a transmission device so that when an appropriate signal is received, the transmission device transmits data, such as location, time, or positional data.

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific examples set forth and the accompanying discussion are intended to be representative of their more general classes. In general, use of any specific example herein is also intended to be representative of its class, and the non-inclusion of such specific components (e.g., steps), devices, and objects herein should not be taken as indicating that limitation is desired. Furthermore, the use of particular shapes within a Figure herein is not intended to connote a shape of any particular element. For example, the use of a star-shape for element 275 in FIG. 2 should not be interpreted as meaning that the element 275 in practice should be star-shaped.

All of the above U.S. patents, U.S. patent application publications, U.S. patent applications, foreign patents, foreign patent applications and non-patent publications referred to in this specification or listed in any Application Data Sheet, are incorporated herein by reference, to the extent not inconsistent herewith.

In addition to the foregoing, other system aspects are described in the claims, drawings, and text forming a part of the present disclosure.

With respect to the use of substantially any plural or singular terms herein, those having skill in the art can translate from the plural to the singular or from the singular to the plural as is appropriate to the context or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

EXAMPLES

Example 1

A substantially thermally sealed storage container may be used to maintain food items below the freeze point (generally 0° C./32° F.). For example, a substantially thermally sealed storage container may be used to increase the shelf life, for example, of fresh food items. In this instance, a fresh food item might include meat, fish, vegetables, fruits, bread, and/or dairy for which the recommended frozen shelf-life may range from 3 months to 1 year (see, e.g., Cornell University Cooperative Extension, Foodkeeper Guide Fact Sheet, which is herein incorporated by reference). Alternatively, a substantially thermally sealed storage container may be used to maintain the temperature of a frozen dessert item such as, for example, ice cream, frozen yoghurt, or ice cream bar. As such, the substantially thermally sealed storage container may hold one or more single serving units of the food item, for example, a single hamburger patty per unit. Alternatively, the substantially thermally sealed storage container may hold one or more multiple serving units, for example, a dozen hamburger patties per unit. Optionally, the substantially thermally sealed storage container may hold more than one type of frozen food item such as, for example, a meat and a vegetable, either packaged together or as separate units. The substantially thermally sealed storage container may contain an internal thermometer or thermostat that indicates whether or not the contents maintain proper temperature during the course of storage.

Example 2

A substantially thermally sealed storage container may be used to maintain one or more units of liquid or beverage below the freeze point (generally 0° C./32° F.). For example, a substantially thermally sealed storage container may be used to maintain water, for example, in a frozen state. As such, a block or blocks of frozen liquid such as water ice obtained from a substantially thermally sealed storage container may be used, for example, in an emergency setting to keep food or medicines cold in a refrigerator, ice chest, or other insulated container. Optionally, a block or blocks of frozen liquid such as water ice obtained from a substantially thermally sealed storage container may be used in a setting where power for refrigeration is not available or is limited, such as, for example, a field station, a military outpost, a refuge camp, a forest service outpost, a climbing or other expedition base camp, or for recreational outings.

Example 3

A substantially thermally sealed storage container may be used to maintain food items at a specific temperature, such as that maintained by standard refrigeration, generally in the range of 37-40° F. (3-4.5° C.). For example, a substantially thermally sealed storage container may be used to maintain units of fresh, non-pasteurized caviar, for example, for 4 weeks in the range of 37-40° F. (see, e.g., Cornell University Cooperative Extension, Foodkeeper Guide Fact Sheet, which is herein incorporated by reference). Similarly, a substantially thermally sealed storage container may be used to maintain units of hard cheeses in the range of 37-40° F. for 6 or more months, for example.

Example 4

A substantially thermally sealed storage container may be used to maintain a liquid or beverage at a specific temperature. A liquid or beverage might be water or flavored water, dairy product or fruit juice, carbonated soda, wine, beer or distilled spirits, for example. A specific temperature may be that at which the liquid or beverage is best stored, for example, for long term aging. For example, a substantially thermally sealed storage container may be used to store wine at an optimal storage temperature range of 50 to 55° F. (10-12° C.). Similarly, a substantially thermally sealed storage container may be used to store beer at a storage temperature range of 45-65° F. Alternatively, a specific temperature may be that at which a liquid or beverage is preferably served. For example, a substantially thermally sealed storage container may store a beverage in a temperature range of 37-40° F. (3-4.5° C.), comparable to a standard refrigerator. Alternatively, a substantially thermally sealed storage container may store a beverage such as beer, for example, at a temperature appropriate for serving depending upon the type of beer, ranging for example from 37 to 53° F. (3-12° C.). The beverage may be directly packaged into the substantially thermally sealed storage container. Alternatively, the beverage may be packaged separately into a can, carton, or bottle, for example, and than further packaged in the substantially thermally sealed storage container. Controlled egress from the substantially thermally sealed storage container of a defined unit of fluid, either with or without packaging, is managed by the interlocks, as described herein.

Example 5

A substantially thermally sealed storage container may be used to keep fluids intended for intravenous administration at or slightly above body temperature (generally 98.6° F./37° C.). In the medical or surgical setting, for example, a substantially thermally sealed storage container may be used to hold artificial plasma or other blood product at appropriate temperature for immediate use. For example, plasma substitutes such as hydroxyethyl starch (HES) are often administered rapidly to patients with hypovolemia and for hemodilutional autotransfusion (HAT) during surgery and anesthesia (Yamakage et al. Safety and beneficial effect on body core temperature of prewarmed plasma substitute hydroxyethyl starch during anesthesia Anesthesiology (2004) 101:A1285, which is herein incorporated by reference). Addition of these agents at room temperature may result in a drop in the patient's core temperature and as such are best administered at or slightly above body temperature. HES has been shown to be stable at 40° C. for at least 3 months. As such, a blood product such as HES, for example, may be stored at 40° C. in a substantially thermally sealed storage container in individually packaged and sterile 250 to 500 ml units, for example, until needed in a medical or surgical setting.

Example 6

Alternatively, a substantially thermally sealed storage container may be used to maintain units of intravenous (IV) solution at or slightly above body temperature. For example, a substantially thermally sealed storage container may hold one or more IV bags containing dextrose or saline for use, for example, in treating dehydration associated with hypothermia. As the core temperature of a hypothermic individual may already be below normal, addition of intravenous fluids should optimally be performed at body temperature to prevent further cooling (Department of Health & Social Services, State of Alaska, Cold Injuries Guidelines Revised version 2005, which is herein incorporated by reference). As such, a substantially thermally sealed storage container containing 250 to 500 ml units of a prewarmed rehydration solution may be used, for example, by first responders in the field such as a paramedic, an emergency medical technician, search and rescue, coast guard, or military personnel.

Example 7

A substantially thermally sealed storage container may also be used to maintain an object at a specific temperature. For example, an integrally thermally sealed container may be used to keep blankets prewarmed, for example, for use in an emergency or medical setting. A medical setting might include using a prewarmed blanket from a substantially thermally sealed storage container to prevent hypothermia at birth in preterm and/or low birth weight babies (Cohen et al. Thermal efficiency of prewarmed cotton, reflective, and forced-warm-air. Int. J. Trauma. Nurs. (2002) 8:4-8, which is herein incorporated by reference). A prewarmed blanket may be used in an emergency situation to treat an individual exhibiting signs of hypothermia. In the instance where the individual is conscious, the warm blanket may be used to completely wrap the body. In the instance where the individual is unconscious and the peripheral vasculature has become constricted and acidic, the warm blanket or parts of the warm blanket may be used to warm the torso, groin, neck, armpits and/or head and as such prevent further loss of core body temperature (Department of Health & Social Services, State of Alaska, Cold Injuries Guidelines Revised version 2005, which is herein incorporated by reference). It is anticipated that a substantially thermally sealed storage container may be used to hold other items for warming a body or extremities such as for example towels, hat, gloves, socks, pants, shirt, or combination thereof.

Example 8

A substantially thermally sealed storage container under pressure may be used to maintain humidified air or oxygen in the range of 43-45° C. (107-122° F.), for example. In a hypothermic individual, loss of heat during respiration may account for 10% to 30% of the body's heat loss, particularly under conditions in which the ambient air temperature is cold. As such, inhalation of warm, water-saturated air is a non-invasive treatment suitable for active core rewarming in the field and donates heat directly to the head, neck, and thoracic core, warming the hypothalamus, the temperature regulation center, the respiratory center, and the cardiac center at the base of the brainstem. (Department of Health & Social Services, State of Alaska, Cold Injuries Guidelines Revised version 2005, which is herein incorporated by reference). In many cases, this rewarming of the central nervous system at the brainstem reverses the cold-induced depression of the respiratory centers and improves the level of consciousness. Alternatively, a substantially thermally sealed storage container may contain water ranging in temperature, for example, from 99 to 212° F. (37-100° C.) that may be used in conjunction with a face mask to provide prewarmed, humidified air to a hypothermic individual. For example, inhaled ambient air may be passed over steaming, prewarmed water prior to entering an individual's lungs. As such, a substantially thermally sealed storage container may dispense a unit of prewarmed water to an external vessel attached to the breathing apparatus. Alternatively, a substantially thermally sealed storage container may dispense a packaged unit of prewarmed water that may be designed to attach directly to the breathing apparatus, for example.

Example 9

A substantially thermally sealed storage container may be used to maintain water, for example, at a temperature appropriate for bathing or cleaning dishes, clothes, and/or equipment in the field. For example, a substantially thermally sealed storage container may contain water at a temperature range of 80 to 100° F. for a "field shower" for use by military, forest service, or first responders, for example, in an emergency following exposure to a hazardous chemical or agent. As such, egress of defined units such as, for example, gallons of warm water may be controlled by interlocks, as described herein.

Example 10

A substantially thermally sealed storage container may be used to maintain water at or just below boiling temperature of 212° F./100° C. In some settings, the water may be sterilized. Boiling water may be used for heating and cooking a variety of ready to eat items such as, for example, beverages including coffee, tea, hot chocolate, and cider, and foods including dehydrated foods and instant soup, noodles, and oatmeal. As such, the substantially thermally sealed storage container may dispense discrete units of water such as, for example, 8 ounces per unit at or near boiling in an emergency or remote setting, for example, where the capacity to heat water by other means is unavailable or limited.

Example 11

A substantially thermally sealed storage container may be used to maintain a non-edible liquid at a specific temperature to facilitate immediate use. For example, a substantially thermally sealed storage container may contain ready to use hot mix asphalt maintained within an optimal spreading temperature range of 280 to 300° F. Hot mix asphalt is routinely used for large paving projects and is manufactured at a local hot mix asphalt facility and delivered to the paving site already warm and ready to be used. As such, hot mix asphalt maintained at temperature in a substantially thermally sealed storage container may be used in those situations in which a local hot mix asphalt facility is not available, for example after damage to a road or an airfield in a remote location, disaster area and/or war zone. Alternatively, hot mix asphalt maintained at temperature in a substantially thermally sealed storage container may be used for a patching project or projects requiring immediate attention by a road or airstrip crew. Optionally, a substantially thermally sealed storage container may be used to maintain new formulations of asphalt such as, for example, warm mix asphalt at temperature ranges of 160-180° F. (Suttmeier, Warm mix asphalt: a cooler alternative (2006) Material Matters, Spring: 21-22, which is herein incorporated by reference).

Example 12

A substantially thermally sealed storage container may be used to maintain a solution of deicing material, such as, for example, ethylene glycol, propylene glycol, salt solutions, urea solutions, or a combination thereof at a temperature appropriate to facilitate removal of ice, snow and/or frost. Propylene glycol is capable of lowering the freezing point of water to about −60° C. and is a common component of solutions used to deice airplanes, for example. Propylene glycol in combination with water and additional salts and/or urea is usually sprayed on hot, in a temperature range of 150 to 180° F., and at high pressure. A small amount of deicing material, for example 25-50 gallons, may be used on an otherwise dry, cold day to warm fuel tanks. Alternatively, a much as 1700 gallons of deicing material have been reportedly used per plane during heavy snow fall. As such, a substantially thermally sealed storage container may dispense a unit of 25-50 gallons, for example, of prewarmed deicing material for minimal deicing of a plane. Alternatively, a substantially thermally sealed storage container may be configured to dispense a large volume or multiple small volume units of deicing material, as appropriate for the conditions.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A substantially thermally sealed storage container, comprising:
   an outer assembly including one or more sections of ultra efficient insulation material substantially defining at least one thermally sealed storage region, wherein the ultra efficient insulation material includes at least two layers of thermal reflective film separated by vacuum, and wherein the outer assembly includes a mechanically operable outer assembly interlock configured to reversibly restrict egress of one or more packaged material units when closed or allow egress of the one or more packaged material units when open;
   an inner assembly including a mechanically operable inner assembly interlock including a region of a size and shape to align with the one or more packaged material units and configured to reversibly restrict egress of the one or more packaged material units when closed or allow egress of the one or more packaged material units when open to provide controllable egress of the one or more packaged material units from one or more of the at least one thermally sealed storage region to the mechanically operable outer assembly interlock;
   an intermediate region between the inner assembly interlock and the outer assembly interlock, the intermediate region following a serpentine path through which the one or more packaged material units are removable from the at least one thermally sealed storage region, the intermediate region configured to completely enclose the one or more packaged materials therein between the closed inner and outer interlock assemblies; and
   one or more heat sink units containing frozen water, the one or more heat sink units thermally connected to one or more of the at least one thermally sealed storage region.

2. The substantially thermally sealed storage container of claim 1, wherein at least one of the inner assembly interlock or the outer assembly interlock operate independently of an electrical power source.

3. The substantially thermally sealed storage container of claim 1, wherein the container includes no active cooling units.

4. The substantially thermally sealed storage container of claim 1, wherein the one or more sections of ultra efficient insulation material include at least one superinsulation material.

5. The substantially thermally sealed storage container of claim 1, wherein the one or more sections of ultra efficient insulation material include:
   at least one layer of thermal reflective material; and
   at least one spacer unit adjacent to the at least one layer of thermal reflective material.

6. The substantially thermally sealed storage container of claim 1, comprising:
   at least one layer of nontoxic material on an interior surface of one or more of the at least one thermally sealed storage region.

7. The substantially thermally sealed storage container of claim 1, comprising:
   at least one layer including at least one metal on an interior surface of one or more of the at least one thermally sealed storage region.

8. The substantially thermally sealed storage container of claim 1, wherein the outer assembly including one or more sections of ultra efficient insulation material substantially defines a plurality of thermally sealed storage regions.

9. The substantially thermally sealed storage container of claim 1, comprising:
   one or more temperature indicators.

10. The substantially thermally sealed storage container of claim 1, comprising:
    one or more sensors.

11. The substantially thermally sealed storage container of claim 1, comprising:
    one or more communications devices.

12. The substantially thermally sealed storage container of claim 11, wherein the one or more communications devices includes at least one:
    one or more recording devices, one or more transmission devices, one or more display devices, or one or more receivers.

13. The substantially thermally sealed storage container of claim 1, comprising:
    at least one region within an interior of the container that is at a higher gaseous pressure than the atmospheric pressure exterior to the container.

14. The substantially thermally sealed storage container of claim 1, comprising:
  at least one authentication device, wherein the at least one authentication device is operably connected to at least one of the inner assembly interlock or the outer assembly interlock.

15. The substantially thermally sealed storage container of claim 1, comprising:
  at least one logging device, wherein the at least one logging device is operably connected to at least one of the inner assembly interlock or the outer assembly interlock.

16. The substantially thermally sealed storage container of claim 1, comprising:
  at least one control ingress device, wherein the at least one control ingress device is operably connected to at least one of the inner assembly interlock or the outer assembly interlock.

17. A substantially thermally sealed storage container, comprising:
  an outer assembly including one or more sections of ultra efficient insulation material defining at least one substantially thermally sealed storage region, wherein the ultra efficient insulation material includes at least two layers of thermal reflective film separated by vacuum;
  an inner assembly including:
    an intermediate region configured to completely enclose the one or more packaged material units therein;
    one or more first mechanically operable interlocks including at least one first selectively operable passageway including a region of a size and shape to align with the one or more packaged material units to provide controllable egress of the one or more packaged material units from the at least one thermally sealed storage region, the first selectively operable passageway between one or more of the at least one storage region and the intermediate region, the one or more first mechanically operable interlocks configured to reversibly restrict egress of the one or more packaged material units when closed or allow egress of the one or more packaged material units when open;
    one or more second mechanically operable interlocks including at least one second selectively operable passageway between the intermediate region and an exterior of the container, the one or more second mechanically operable interlocks configured to reversibly restrict egress of the one or more packaged material units when closed or allow egress of the one or more packaged material units when open, wherein the intermediate region extends between the one or more first mechanically operable interlocks and the one or more second mechanically operable interlocks; and
    one or more mechanical actuators operably coupled to one or more of the at least one first or second selectively operable passageway configured to open or close said first or second selectively operable passageway; and
  one or more heat sink units containing frozen water, the one or more heat sink units thermally connected to one or more of the at least one thermally sealed storage region.

18. The substantially thermally sealed storage container of claim 17, wherein at least one of the one or more mechanically operable interlocks operate independently of an electrical power source.

19. The substantially thermally sealed storage container of claim 17, wherein the one or more mechanically operable interlocks including at least one first selectively operable passageway include at least one magnet and the one or more mechanically operable interlocks including at least one second selectively operable passageway include at least one magnet.

20. The substantially thermally sealed storage container of claim 17, wherein the container includes no active cooling units.

21. The substantially thermally sealed storage container of claim 17, wherein there are two or more intermediate regions between one or more of the at least one substantially thermally sealed storage region of the container and the exterior of the container.

22. The substantially thermally sealed storage container of claim 17, comprising:
  at least one externally-operable closure operably coupled to one or more of the at least one second selectively operable passageway.

23. The substantially thermally sealed storage container of claim 17, wherein the one or more sections of ultra efficient insulation material include:
  at least one layer of thermal reflective material; and
  at least one spacer unit adjacent to the at least one layer of thermal reflective material.

24. The substantially thermally sealed storage container of claim 17, wherein the one or more sections of ultra efficient insulation material include at least one superinsulation material.

25. The substantially thermally sealed storage container of claim 17, comprising:
  at least one layer of nontoxic material on an interior surface of one or more of the at least one substantially thermally sealed storage region.

26. The substantially thermally sealed storage container of claim 17, comprising:
  at least one layer including at least one metal on an interior surface of one or more of the at least one substantially thermally sealed storage region.

27. The substantially thermally sealed storage container of claim 17, wherein there are a plurality of storage regions within the container.

28. The substantially thermally sealed storage container of claim 17, comprising:
  one or more temperature indicators.

29. The substantially thermally sealed storage container of claim 17, comprising:
  one or more sensors.

30. The substantially thermally sealed storage container of claim 17, comprising:
  one or more communications devices.

31. The substantially thermally sealed storage container of claim 17, comprising:
  at least one compartment within one or more of the at least one substantially thermally sealed storage region, wherein the at least one compartment is at a higher gaseous pressure than the exterior atmospheric pressure of the container.

32. The substantially thermally sealed storage container of claim 17, comprising:
  at least one authentication device, wherein the at least one authentication device is operably connected to at least one of the one or more mechanically operable interlocks.

33. The substantially thermally sealed storage container of claim 17, comprising:
  at least one logging device, wherein the at least one logging device is operably connected to at least one of the one or more mechanically operable interlocks.

34. The substantially thermally sealed storage container of claim 17, comprising:
- at least one control ingress device, wherein the at least one control ingress device is operably connected to at least one of the one or more mechanically operable interlocks.

35. A substantially thermally sealed storage container, comprising:
- a structural assembly including one or more sections of ultra efficient insulation material primarily defining at least one substantially thermally sealed storage region including an interior surface and an exterior surface, wherein the ultra efficient insulation material includes at least two layers of thermal reflective material separated by vacuum;
- an outlet assembly including one or more elongated outlet channels that follow a serpentine path traversing laterally from a first side of the interior surface of the thermally sealed storage region to a second side of the interior surface of the thermally sealed storage container substantially opposite to the first side, wherein the one or more elongated outlet channels include a region of a size and shape to align with one or more packaged material units to provide controllable egress of the one or more packaged material units from the at least one storage region, and wherein the one or more elongated outlet channels substantially follow an elongated thermal pathway with a high aspect ratio; and
- one or more heat sink units containing frozen water, the one or more heat sink units thermally connected to one or more of the at least one thermally sealed storage region.

36. The substantially thermally sealed storage container of claim 35, comprising:
- at least one externally-controllable opening between at least one of the one or more elongated outlet channels and one or more of the at least one substantially thermally sealed storage region.

37. The substantially thermally sealed storage container of claim 35, comprising:
- at least one externally-controllable opening between at least one of the one or more elongated outlet channels and the exterior of the container.

38. The substantially thermally sealed storage container of claim 35, wherein the container includes no active cooling units.

39. The substantially thermally sealed storage container of claim 35, wherein the one or more sections of ultra efficient insulation material include:
- at least one layer of thermal reflective material; and
- at least one spacer unit adjacent to the at least one layer of thermal reflective material.

40. The substantially thermally sealed storage container of claim 35, wherein the one or more sections of ultra efficient insulation material include at least one superinsulation material.

41. The substantially thermally sealed storage container of claim 35, comprising:
- at least one layer of nontoxic material on an interior surface of one or more of the at least one substantially thermally sealed storage region.

42. The substantially thermally sealed storage container of claim 35, comprising:
- at least one layer including at least one metal on an interior surface of one or more of the at least one substantially thermally sealed storage region.

43. The substantially thermally sealed storage container of claim 35, comprising:
- one or more temperature indicators.

44. The substantially thermally sealed storage container of claim 35, comprising:
- one or more sensors.

45. The substantially thermally sealed storage container of claim 35, comprising:
- one or more communications devices.

46. The substantially thermally sealed storage container of claim 35, comprising:
- at least one compartment within one or more of the at least one substantially thermally sealed storage region that is at a higher gaseous pressure than the atmospheric pressure outside of the container.

47. The substantially thermally sealed storage container of claim 35, comprising:
- at least one authentication device, wherein the at least one authentication device is operably connected to at least one of the one or more elongated outlet channels.

48. The substantially thermally sealed storage container of claim 35, comprising:
- at least one logging device, wherein the at least one logging device is operably connected to at least one of the one or more elongated outlet channels.

49. The substantially thermally sealed storage container of claim 35, comprising:
- at least one externally-controllable opening between at least one of the one or more elongated outlet channels and one or more of the at least one substantially thermally sealed storage region or at least one externally-controllable opening between at least one of the one or more elongated outlet channels and the exterior of the container
- at least one control ingress device, wherein the at least one control ingress device is operably connected to at least one of the externally-controllable openings.

50. The substantially thermally sealed storage container of claim 1, comprising:
- one or more removable inserts within an interior of one or more of the at least one thermally sealed storage region.

51. The substantially thermally sealed storage container of claim 17, comprising:
- one or more removable inserts within an interior of one or more of the at least one substantially thermally sealed storage region.

52. The substantially thermally sealed storage container of claim 35, comprising:
- one or more removable inserts within an interior of one or more of the at least one substantially thermally sealed storage region.

53. A substantially thermally sealed storage container, comprising:
- an outer assembly including one or more sections of ultra efficient insulation material, the ultra efficient insulation material including high vacuum;
- an outer structural layer substantially covering an exterior surface of the outer assembly;
- an inner structural layer substantially covering an interior surface of the outer assembly, the inner structural layer defining a substantially thermally sealed storage region;
- an inner assembly positioned within the substantially thermally sealed storage region, the inner assembly including one or more mechanically operable interlocks configured to reversibly restrict egress of one or more packaged material units when closed or allow egress of the one or more packaged material units when open, the one or more mechanically operable interlocks including a region of a size and shape to align with one or more packaged material units to provide controllable egress of a quantity of the one or more packaged material units from the substantially thermally sealed storage region;

one or more intermediate regions between the one or more mechanically operable interlocks, the one or more intermediate regions following a serpentine path through which the one or more packaged material units are removable from the substantially sealed thermally sealed storage region, the one or more intermediate regions sized and configured to completely enclose one or more of the one or more packaged material units therein between the closed one or more mechanically operable interlocks; and one or more heat sink units containing frozen water, the one or more heat sink units thermally connected to one or more of the at least one thermally sealed storage region.

54. The substantially thermally sealed storage container of claim 35, wherein the one or more elongated outlet channels and the elongated thermal pathway with a high aspect ratio exhibit a spiral configuration.

* * * * *